United States Patent
Kwon

(10) Patent No.: US 10,397,975 B2
(45) Date of Patent: *Aug. 27, 2019

(54) METHOD AND APPARATUS FOR PERFORMING ACTIVATION/DEACTIVATION OF SERVING CELL IN WIRELESS COMMUNICATION SYSTEM SUPPORTING DUAL CONNECTIVITY

(71) Applicants: SK TELECOM CO., LTD., Seoul OT (KR); INNOSKY, Seoul (KR)

(72) Inventor: Ki Bum Kwon, Seoul OT (KR)

(73) Assignees: SK TELECOM CO., LTD., Seoul (KR); INNOSKY, Seoul (KR)

(*) Notice: Subject to any disclaimer, the term of this patent is extended or adjusted under 35 U.S.C. 154(b) by 44 days.

This patent is subject to a terminal disclaimer.

(21) Appl. No.: 16/014,331

(22) Filed: Jun. 21, 2018

(65) Prior Publication Data

US 2018/0302945 A1 Oct. 18, 2018

Related U.S. Application Data

(63) Continuation of application No. 15/221,911, filed on Jul. 28, 2016, now Pat. No. 10,028,328, which is a
(Continued)

(30) Foreign Application Priority Data

Sep. 27, 2013 (KR) .......... 10-2013-0115630
Mar. 18, 2014 (KR) .......... 10-2014-0031649

(51) Int. Cl.
*H04L 5/00* (2006.01)
*H04W 76/15* (2018.01)
(Continued)

(52) U.S. Cl.
CPC ............. *H04W 76/27* (2018.02); *H04L 5/001* (2013.01); *H04L 5/0098* (2013.01);
(Continued)

(58) Field of Classification Search
CPC .......... H04W 76/046; H04W 76/025
(Continued)

(56) References Cited

U.S. PATENT DOCUMENTS 9,439,233 B2 9/2016 Kwon
10,028,328 B2* 7/2018 Kwon .......... H04W 76/27
(Continued)

FOREIGN PATENT DOCUMENTS

CN 102668412 A 9/2012
CN 103313375 A 9/2013

OTHER PUBLICATIONS

"3rd Generation Partnership Project; Technical Specification Group Radio Access Network; Evolved Universal Terrestrial Radio Access (E-UTRA); Medium Access Control (Release 11)," 3GPP TS 36.321 V11.3.0, Jun. 2013, pp. 1-57, 3GPP Organizational Partners.
(Continued)

Primary Examiner — Peter G Solinsky
(74) Attorney, Agent, or Firm — Paratus Law Group, PLLC

(57) ABSTRACT

Provided is an apparatus and method for performing activation/deactivation of a serving cell in a wireless communication system supporting dual connectivity. The method for performing activation/deactivation of serving cell by a user equipment in a wireless communication system includes configuring a dual connectivity with at least two different base stations based on dual connectivity configuration information received through RRC (Radio Resource Control) message from a base station, receiving activation/deactivation information about secondary serving cell configured for the UE from each of two different base stations, and selectively applying the activation/deactivation information about the secondary serving cell configured for the UE based on information including the secondary serving cell provided by the base station or information about the base station providing the secondary serving cell configured for the UE.

17 Claims, 23 Drawing Sheets

Related U.S. Application Data continuation of application No. 14/498,577, filed on Sep. 26, 2014, now Pat. No. 9,439,233.

(51) Int. Cl.
*H04W 76/27* (2018.01)
*H04W 76/38* (2018.01)
*H04W 84/04* (2009.01)
*H04W 88/06* (2009.01)

(52) U.S. Cl.
CPC .......... *H04W 76/15* (2018.02); *H04W 76/38* (2018.02); *H04W 84/042* (2013.01); *H04W 88/06* (2013.01)

(58) Field of Classification Search
USPC ........................................................ 370/329
See application file for complete search history.

(56) References Cited

U.S. PATENT DOCUMENTS

| | | |
|---|---|---|
| 2011/0105107 A1 | 5/2011 | Kwon et al. |
| 2012/0176926 A1 | 7/2012 | Jang et al. |
| 2012/0207089 A1 | 8/2012 | Kone |
| 2013/0148535 A1 | 6/2013 | Baghel et al. |
| 2013/0242790 A1 | 9/2013 | Kwon et al. |
| 2014/0086127 A1 | 3/2014 | Kim et al. |
| 2015/0036666 A1 | 2/2015 | Blankenship et al. |
| 2015/0092768 A1 | 4/2015 | Ng et al. |
| 2015/0099501 A1 | 4/2015 | Kim et al. |
| 2015/0099503 A1 | 4/2015 | Kuo |
| 2015/0103771 A1 | 4/2015 | Kim et al. |
| 2015/0181473 A1 | 6/2015 | Horn et al. |
| 2015/0189574 A1 | 7/2015 | Ng et al. |
| 2015/0215929 A1 | 7/2015 | Damnjanovic et al. |
| 2015/0223149 A1 | 8/2015 | Liu et al. |
| 2015/0264592 A1 | 9/2015 | Novlan et al. |
| 2015/0271744 A1 | 9/2015 | Liu et al. |
| 2015/0271806 A1 | 9/2015 | Kim et al. |
| 2015/0327233 A1 | 11/2015 | Liu et al. |
| 2015/0373559 A1 | 12/2015 | Hong |
| 2016/0014626 A1 | 1/2016 | Yi et al. |
| 2016/0021895 A1 | 1/2016 | Axmon et al. |
| 2016/0028585 A1 | 1/2016 | Wager et al. |
| 2016/0029337 A1 | 1/2016 | Ng et al. |

OTHER PUBLICATIONS

"Discussions on Activation/Deactivation for Dual connectivity", 3GPP TSG RAN WG2 Meeting #85, ITL Inc., Feb. 10-14, 2014, pp. 1-4.

"Activation/Deactivation of SCells", 3GPP TSG-RAN WG2 #70bis, Jun. 28-Jul. 2, 2010, pp. 1-3, Nokia Corporation, Stockholm, Sweden.

International Search Report for International Patent Application No. PCT/KR2014/003976, dated Dec. 24, 2014.

Written Opinion for international Patent Application No. PCT/KR2014/008976, dated Dec. 24, 2014.

Chinese Office Action for related CN application No. 201480052265.4 dated Oct. 19, 2018 from Chinese Patent Office.

* cited by examiner

FIG. 13

| R | R | E | LCID | Oct 1

FIG. 14

| $C_7$ | $C_6$ | $C_5$ | $C_4$ | $C_3$ | $C_2$ | $C_1$ | R | Oct 1

METHOD AND APPARATUS FOR PERFORMING ACTIVATION/DEACTIVATION OF SERVING CELL IN WIRELESS COMMUNICATION SYSTEM SUPPORTING DUAL CONNECTIVITY

CROSS-REFERENCE TO RELATED APPLICATIONS

This application is a continuation of U.S. patent application Ser. No. 15/221,911 (filed on Jul. 28, 2016), which is a continuation of a U.S. patent application Ser. No. 14/498,577, (filed on Sep. 26, 2014 and issued as U.S. Pat. No. 9,439,233 on Sep. 6, 2016), which claims priority from and the benefit of Korean Patent Application Nos. 10-2013-0115630, filed on Sep. 27, 2013, and 10-2014-0031649, filed on Mar. 18, 2014, which are all hereby incorporated by reference in their entirety.

BACKGROUND

1. Field

The present invention relates to a method and apparatus for performing activation/deactivation of a secondary serving cell when a user equipment is connected to two different base stations supporting a dual connectivity in a wireless communication system.

2. Discussion of the Background

In a wireless communication system, a user equipment (UE) may perform a wireless communication through two or more base stations among a plurality of base stations each configuring at least one serving cell. This feature may be referred to as dual connectivity. In other words, the dual connectivity may be an operation in which a UE that is configured in a Radio Resource Control (RRC) connected state with at least two different network points uses radio resources provided by the at least two network points. Here, the at least two network points may be a plurality of base stations, which are physically or logically distinguished from each other, and one of the at least two network points may be a master base station (MeNB: Master evolved NodeB) and the others of the at least two network points may be one or more secondary base stations (SeNB: Secondary evolved NodeB).

In dual connectivity, a base station transmits downlink data and receives uplink data through a bearer configured for a UE. Here, a bearer may be configured through one base station or may be configured through the at least two different base stations. Further, in dual connectivity, at least one serving cell may be configured for each base station, and each serving cell may be operated in an activation or deactivation state. A primary serving cell (PCell), which is configurable according to existing carrier aggregation (CA) scheme, may be configured in the master base station. In the secondary base station(s), only secondary serving cell(s) (SCell(s)) may be configured. The CA scheme is a technology to effectively use divided narrow bands, and the CA scheme may provide an effect that a base station uses a logically wide band by aggregating physically continuous or non-continuous bands in a frequency domain.

When a UE is connected to a base station, the base station transmits to the UE an activation/deactivation indicators for secondary serving cells configured for the base station to optimize the battery consumption of the UE, and the UE activates or deactivates secondary serving cells configured for the UE based on the indicator received from the base station. However, in dual connectivity, if the master base station and secondary base station each transmits activation/deactivation indicators for a whole secondary serving cells configured for the respective base station, a problem that a base station also indicates activation/deactivation of other serving cells provided by other base stations may be occurred since the activation/deactivation indicators transmitted from each of the base stations may include activation/deactivation indicators for all secondary serving cells configured for the UE. Moreover, in dual connectivity, each base station has a Medium Access Control (MAC) scheduler, respectively, and each MAC scheduler is operated independently. Accordingly, it is not possible to determine activation/deactivation for serving cells configured of other base station. Thus, there is a need to resolve above the mentioned problems.

SUMMARY

Exemplary embodiments of the present invention provide a method and apparatus for performing activation/deactivation of a serving cell in a wireless communication system supporting dual connectivity.

Exemplary embodiments of the present invention provide a method and apparatus for enabling independent operation of a MAC scheduler of each base station without additional information exchanges between two base stations connected to a UE supporting dual connectivity.

Exemplary embodiments of the present invention provide a method and apparatus for performing to maintain a MAC message format of activation/deactivation of a secondary serving cell in a wireless communication system supporting dual connectivity.

According to an exemplary embodiment of the present invention, a method of performing activation/deactivation by a user equipment (UE) in a wireless communication system includes configuring a dual connectivity with at least two different base stations based on dual connectivity configuration information received from a base station via a Radio Resource Control (RRC) message, receiving activation/deactivation information of a serving cell (SCell) configured for the UE from each of the at least two different base stations, respectively, and selectively applying the activation/deactivation information to the serving cell based on information about a timing advance group including serving cells provided by the base stations or information about a base station that provides which serving cell is configured for the UE.

According to another exemplary embodiment of the present invention, a user equipment (UE) to perform activation/deactivation of a serving cell includes a receiver to receive, from a base station via a Radio Resource Control (RRC) message, dual connectivity configuration information for a dual connectivity with at least two base stations, and to receive activation/deactivation information of a serving cell configured for the UE, a determination unit to determine which of the at least two base stations provides which serving cell, with respect to each of serving cells configured for the UE, based on information about a timing advance group including serving cells provided by the base stations or information about a base station that provides the serving cell configured for the UE, and an application unit to selectively apply the activation/deactivation information of a serving cell configured for the UE according to the determination.

Each base station may maintain the existing message format by generating information of activation/deactivation MAC Control Element (CE) and transmitting information of the activation/deactivation MAC CE to a UE. That is, the each base station may transmit the activation/deactivation MAC CE to the UE independently. Therefore, this embodiments of the present invention enables independent operation of each MAC scheduler of the each base station without additional information exchanges between two base stations.

BRIEF DESCRIPTION OF THE DRAWINGS

FIG. 13 is a diagram illustrating a structure of a MAC subheader.

FIG. 14 is a diagram illustrating a structure of a MAC Control Element (CE).

DETAILED DESCRIPTION OF THE ILLUSTRATED EMBODIMENTS

Figure 1:
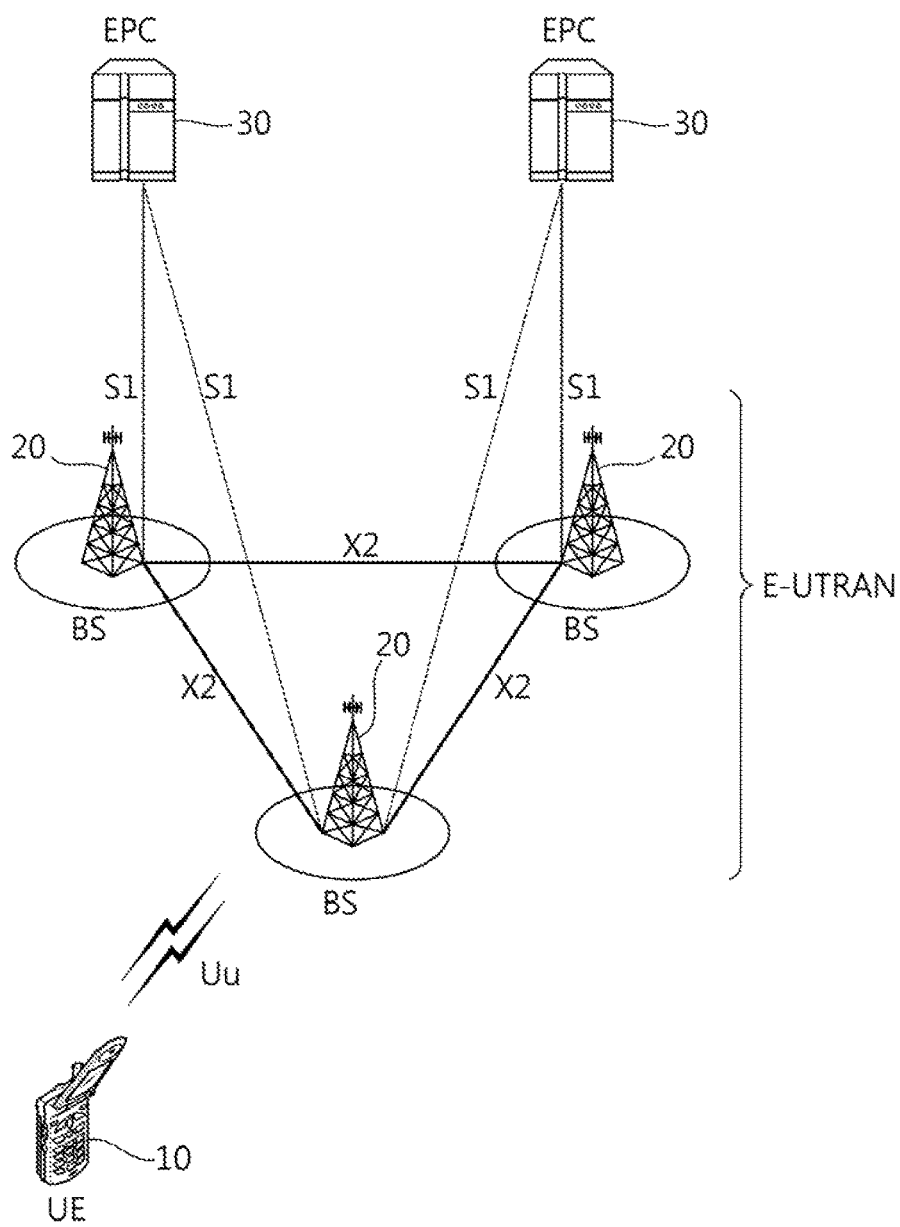
FIG. 1 is a diagram illustrating a network structure of a wireless communication system.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

FIG. 1 is a diagram illustrating a network structure of a wireless communication system.

FIG. 1 illustrates a network structure of an Evolved-Universal Mobile Telecommunications System (E-UMTS) as an example of the wireless communication system. The E-UMTS may be Evolved-UMTS Terrestrial Radio Access (E-UTRA) system, Long Term Evolution (LTE) system, or LTE-Advanced (LTE-A) system. The wireless communication system may utilize various multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA.

Referring to FIG. 1, an Evolved-UMTS Terrestrial Radio Access Network (E-UTRAN) includes a base station (eNB: evolved NodeB) 20 that provides a Control Plane (CP) and a User Plane (UP) to a User Equipment (UE) 10.

The UE 10 may be stationary or have a mobility, and the UE 10 may be referred to as a mobile station (MS), an advanced MS (AMS), a user terminal (UT), a subscriber station (SS), a wireless device, and the like.

The base station 20 may be a station that communicates with the UE 10, and the base station 20 may be referred to as a base station (BS), a base transceiver system (BTS), an access point (AP), a femto base station (femto-eNB), a pico base station (pico-eNB), a home base station (Home eNB), a relay, and the like. The base stations 20 may be physically connected with each other via an optical cable or digital subscriber line (DSL), and the like, and may transceiver a signal or a message with each other via Xn interfaces. FIG. 1 shows an example in which the base stations 20 are connected with each other via an X2 interface.

Hereinafter, logical connections among entities without providing detailed description of physical connections among the entities are described. As shown in FIG. 1, a base station 20 may be connected to a Evolved Packet Core (EPC) 30 via an S1 interface. More specifically, a base station 20 may be connected to Mobility Management Entity (MME) via an S1-MME interface, and may be connected to a Serving Gateway (S-GW) via an S1-U interface. A base station 20 may transmit to and receive from an MME, via an S1-MME interface, context information of a UE 10 and information about a mobility support for a UE 10. Further, the base station 20 may transmit to and receive from an S-GW, via an S1-U interface, data for providing service to each UE 10.

Although not shown in FIG. 1, an EPC 30 includes an MME, an S-GW, and a Packet data network-Gateway (P-GW). An MME has access information of a UE 10 or capability information of a UE 10, and such information may be used for mobility management of the UE 10. An S-GW may be a gateway having an E-UTRAN as a terminal node, and a P-GW may be a gateway having a Packet Data Network (PDN) as a terminal node.

A combination of E-UTRAN and one or more EPCs 30 may be referred to as an Evolved packet System (EPS). All traffic flows from a radio link through which a UE 10 is coupled to a base station 20 to a PDN that provides a connection to a service entity may be performed on the basis of an Internet Protocol (IP).

A radio interface between a UE 10 and a base station 20 may be referred to as a "Uu interface". Radio interface protocol layers between a UE 10 and a network may include the layer 1 (L1), the layer 2 (L2), and the layer 3 (L3) defined in the $3^{rd}$ Generation Partnership Project (3GPP) protocol specifications for a wireless communication system, such as UMTS, LTE, LTE-Advanced, and the like. Among the layers, a physical layer included in the layer 1 provides an information transfer service using one or more physical channels, and a Radio Resource Control (RRC) layer included in the layer 3 transmits and receives a message, and controls radio resources between a UE 10 and a network.

Figure 2:
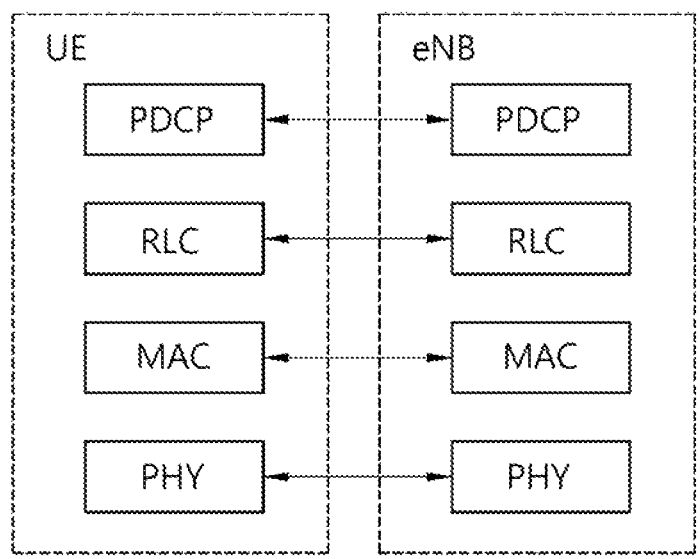
FIG. 2 is a block diagram illustrating a wireless protocol structure for a user plane.
Figure 3:
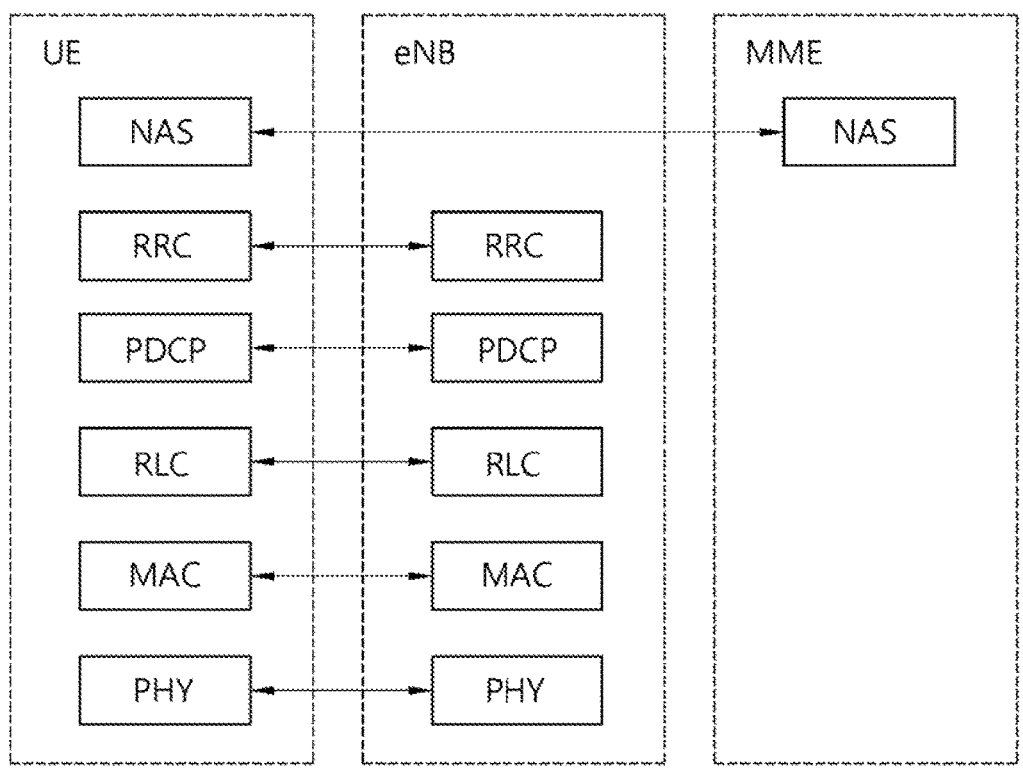
FIG. 3 is a block diagram illustrating a wireless protocol structure for a control plane.

FIG. 2 is a block diagram illustrating a wireless protocol structure for a user plane, and FIG. 3 is a block diagram illustrating a wireless protocol structure for a control plane. The user plane is a protocol stack for user data transmission, and the control plane is a protocol stack for control signal transmission.

Referring to FIG. 2 and FIG. 3, a physical layer (PHY) of a UE provides information transfer service to a higher layer of the UE via a physical channel, and a physical layer (PHY) of a base station provides information transfer service to a higher layer of the base station via a physical channel. A physical layer is coupled to a Medium Access Control (MAC) layer, which is a higher layer of the physical layer, via a transport channel. Data is transmitted between a MAC layer and a physical layer via a transport channel. Transport channels are classified according to a method of data transmission via a wireless interface. Further, data is communicated between different physical layers, i.e., a physical layer of a UE and a physical layer of a base station, via a physical channel. The physical channel may be modulated based on an Orthogonal Frequency Division Multiplexing (OFDM) scheme, and time frequency domains may be utilized by a plurality of antennas as radio resources.

For example, Physical Downlink Control CHannel (PDCCH), which is one of physical channels, assigns Paging CHannel (PCH) and DownLink Shared CHannel (DL-SCH) resources to a UE, transmits to the UE Hybrid Automaitc Repeat reQuest (HARQ) information relating to DL-SCH, and transmits to the UE an uplink scheduling grant that indicates uplink transmission resource allocations. Further, Physical Control Format Indicator CHannel (PCFICH) indicates the number of OFDM symbols used for PDCCHs to a UE, and the PCFICH is transmitted in every subframe. Physical HARQ Indicator CHannel (PHICH) transmits an HARQ Acknowlegement/Negative acknowledgement (ACK/NAK) signal in response to an uplink transmission. Physical Uplink Control CHannel (PUCCH) transmits uplink control information, such as an HARQ ACK/NACK responsive to a downlink transmission, a scheduling request, and a Channel Quality Indication (CQI). Physical Uplink Shared CHannel (PUSCH) transmits Uplink Shared CHannel (UL-SCH). In accordance with a configuration or a request of a base station, PUSCH may include Channel State Information (CSI), such as HARQ ACK/NACK and CQI.

A MAC layer may perform a mapping between a logical channel and a transport channel and perform a multiplexing of a MAC Service Data Unit (SDU) from a logical channel onto a transport block to be delivered to a physical channel on a transport channel and a demultiplexing of a MAC SDU from a logical channel from a transport block delivered from a physical layer on a transport channel. A MAC layer also provides a service to a Radio Link Control (RLC) layer via a logical channel. A logical channel includes a control channel for delivering control plane information and a traffic channel for delivering user plane information. Examples of services provided to a higher layer from a MAC layer include data transfer or radio resource allocation.

Functions of an RLC layer may include a concatenation, segmentation, and reassembly of RLC SDUs. In order to ensure various Quality of Services (QoS) required by a Radio Bearer (RB), the RLC layer may provide three operation modes including Transparent Mode (TM), Unacknowledged Mode (UM), and Acknowledged Mode (AM).

The TM may be generally used for initial connection configuration.

The UM is used for a real-time data transfer, such as a data streaming or a Voice over Internet Protocol (VoIP), and data transmission speed has a priority over data integrity in the UM. On the other hand, data integrity has a priority over data transmission speed in the AM, which is appropriate for a high-capacity data transmission or a data transmission less sensitive to a transmission delay. On the basis of QoS information of each EPS bearer configured to be connected to a UE, a base station determines an RLC mode in a Radio Bearer corresponding to the respective EPS bearer and configures parameters in the RLC to satisfy a QoS.

The size of RLC SDUs may vary, and the size may be supported in bytes. RLC Protocol Data Units (PDUs) may be determined, if a transmission opportunity is notified from a lower layer (e.g., a MAC layer), and transmitted to a lower layer. The transmission opportunity may be notified along with a total size of RLC PDUs to be transmitted. Further, the transmission opportunity and the total size of RLC PDUs to be transmitted may be notified separately.

Functions of Packet Data Convergence Protocol (PDCP) layer in a user plane may include a user data transmission, header compression and ciphering, and control plane data transmission and ciphering/integrity protection.

Referring to FIG. 3, an RRC layer controls logical channels, transport channels, and physical channels in relation to a configuration, a re-configuration, and a release of Radio Bearers (RBs). An RB may refers to a logical path provided by a layer 1 (PHY layer) and a layer 2 (MAC layer, RLC layer, and PDCP layer) for a data transmission between a UE and a network. A configuration of an RB refers to a configuration of a wireless protocol layer and channel characteristic for providing a specific service and a configuration of each parameter and operation method. An RB may include a Signaling RB (SRB) and a Data RB (DRB). The SRB may be used a channel to transmit an RRC message and Non-Access stratum (NAS) message in a control plane, and the DRB may be used as a channel to transmit user data in a user plane.

The NAS layer, a higher layer of the RRC layer, may perform a session management, a mobility management, and the like. If an RRC connection exists between an RRC layer of a UE and an RRC layer of an E-UTRAN, the UE is in an RRC connected state. If an RRC connection does not exist between an RRC layer of a UE and an RRC layer of an E-UTRAN, the UE is in an RRC idle state.

In order to transmit user data (e.g., an IP packet) from a UE to an external internet network or to receive user data from an external internet network to the UE, resources need to be assigned on various paths between mobile network entities that exist between the UE and the external internet network. A bearer refers to a path between the mobile network entities in which a data transmission is enabled by the resource assignment.

Figure 4:
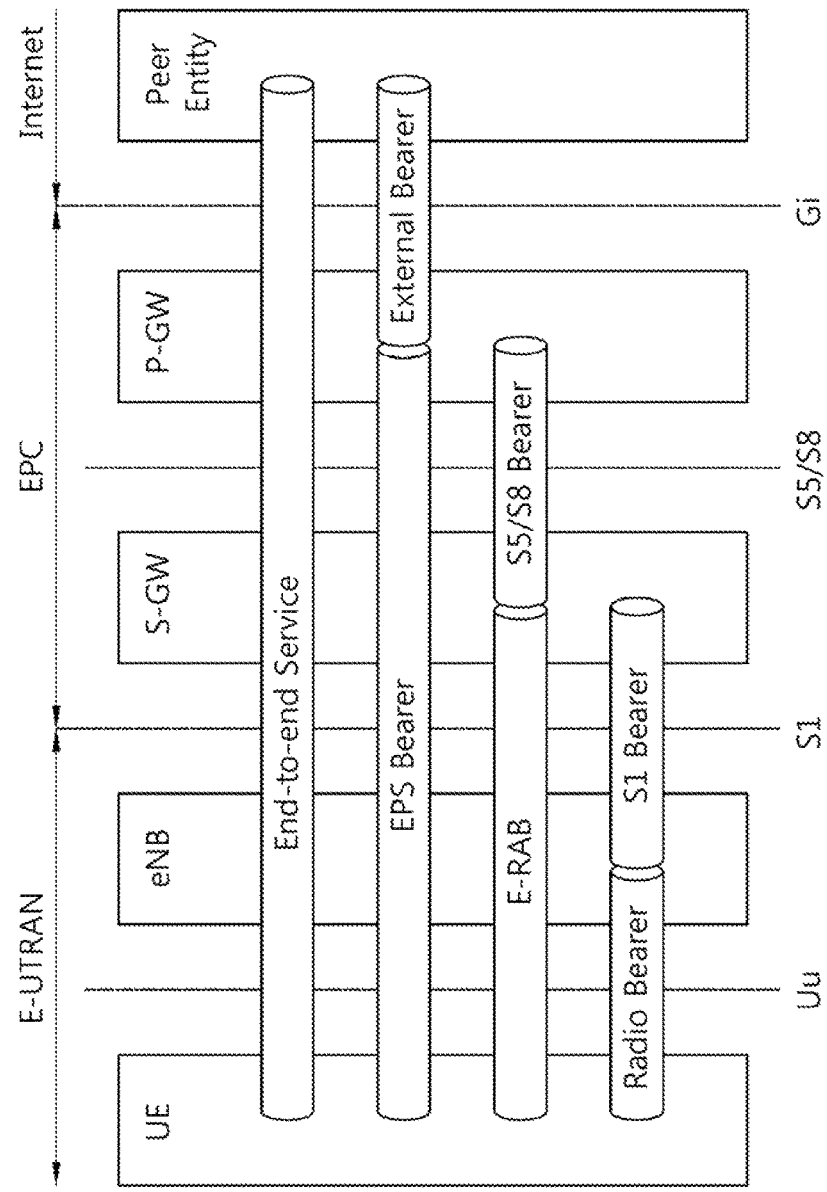
FIG. 4 is a diagram illustrating a structure of a bearer service in a wireless communication system.

FIG. 4 is a diagram illustrating a structure of a bearer service in a wireless communication system.

In FIG. 4, a path for providing an End-to-End service between a UE and an internet network is illustrated. Here, the End-to-End service refers to a service that requires a path between a UE and a P-GW (an EPS bearer) and a path between the P-GW and the external internet network (an external bearer) for a data service between the UE and the internet network. The external path may be the bearer between the P-GW and the internet network.

In order to transmit data from a UE to an external internet network, the UE transmits data to a base station (eNB) via an RB. Then, the base station transmits the data received from the UE to an S-GW via an S1 bearer. The S-GW transmits the data received from the base station to a P-GW via an S5/S8 bearer, and the P-GW transmits the data received from the S-GW to a destination in the external internet network via the external bearer.

Likewise, in order to transmit data from the external internet network to the UE, the data may be transmitted via the above mentioned bearers according to the reverse direction of the data transmission direction from the UE to the external internet network described above.

As described above, different bearers may be defined for each interface in a wireless communication system, thereby ensuring independence between interfaces. Hereinafter, bearers of each interface will be described in more detail.

The bearers provided by a wireless communication system may be referred to as an EPS bearer. The EPS bearer may be a path configured between a UE and a P-GW for transmitting an IP traffic with a specific QoS. The P-GW may receive an IP flow from an internet network or transmit an IP flow to the internet network. Each EPS bearer may be configured by QoS determination parameters, which indicate a characteristic of a transport path. One or more EPS bearers may be configured for a UE, and one EPS bearer may indicate one E-UTRAN Radio Access Bearer (E-RAB) and one concatenation of an S5/S8 bearer.

An RB exists between a UE and a base station and transmits a packet of an EPS bearer. A specific RB has one-on-one mapping relationship with a corresponding EPS bearer/E-RAB.

An S1 bearer, which is a bearer that exists between an S-GW and a base station, transmits a packet of an E-RAB.

An S5/S8 bearer is a bearer of an S5/S8 interface. S5 and S8 bearers are bearers that exist for interfaces between S-GW and P-GW. An S5 interface exists if the S-GW and the P-GW belong to the same service provider, and an S8 interface exists if the S-GW belongs to a service provider of a roaming service (a visited Public Land Mobile Network (PLMN)) and the P-GW belongs to a subscribed service provider (a Home PLMN).

An E-RAB indicates an S1 bearer and a concatenation of a corresponding RB. If an E-RAB exists, a mapping relationship exists between the E-RAB and one EPS bearer. More specifically, one EPS bearer corresponds to one RB, one S1 bearer, or one S5/S8 bearer. An S1 bearer is a bearer for an interface between a base station and an S-GW.

As described above, an RB includes a data RB (DRB) and a signaling RB (SRB). However, a DRB provided by Uu interface for supporting a user service may be referred to as an RB throughout the description. Accordingly, an RB as the DRB needs to be distinguished from the SRB. An RB is a path through which user plane data is delivered, and an SRB is a path through which control plane data, such control messages of RRC layer and NAS, is delivered. One-on-one mapping relationship exists between an RB/E-RAB and an EPS bearer. In order to generate a DRB that couples an uplink and a downlink, a base station performs one-on-one mapping between the DRB and an S1 bearer and stores the mapping result. In order to generate an S1 bearer and an S5/S8 bearer that couple an uplink and a downlink, a S-GW performs one-on-one mapping between the S1 bearer and the S5/S8 bearer and stores the mapping result.

Types of EPS bearers include a default bearer and a dedicated bearer. If a UE accesses a wireless communication network, the UE is assigned with an IP address, a PDN connection is established and a default EPS bearer is generated for the UE. The default bearer is generated newly if a new PDN connection is established. If a user starts to use a service in which a QoS is not ensured by a default bearer, e.g., a VoD service, while the user is using a service (e.g., an internet, etc.) through the default bearer, a dedicated bearer is generated as an on-demand. The dedicated bearer may be configured with different QoS from a QoS configured for an existing bearer. The QoS determination parameters for the dedicated bearer may be provided by a Policy and Charging Rule Function (PCRF). In order to generate a dedicated bearer, the PCRF may determine QoS determination parameters by receiving subscription information of a user from a Subscriber Profile Repository (SPR). For example, the maximum number of generated dedicated bearer may be 15, and 4 bearers among the 15 dedicated bearers are not used in an LTE system. Accordingly, the maximum number of generated dedicated bearer may be 11 in an LTE system.

An EPS bearer includes QoS Class Identifier (QCI) and Allocation and Retention Priority (ARP) as basic QoS determination parameters. EPS bearers may be classified into a Guaranteed Bit Rate (GBR)-type bearer and a non-GBR-type bearer according to a QCI resource type. A default bearer is configured as a non-GBR-type bearer, and a dedicated bearer may be configured as a GBR-type bearer or a non-GBR-type bearer. A GBR-type bearer has GBR and Maximum Bit Rate (MBR) as QoS determination parameters in addition to the QCI and ARP. After determining a QoS requirement of a wireless communication system as an EPS bearer, a specific QoS is determined for each interface. Each interface configures a bearer according to its own QoS requirement.

Figure 5:
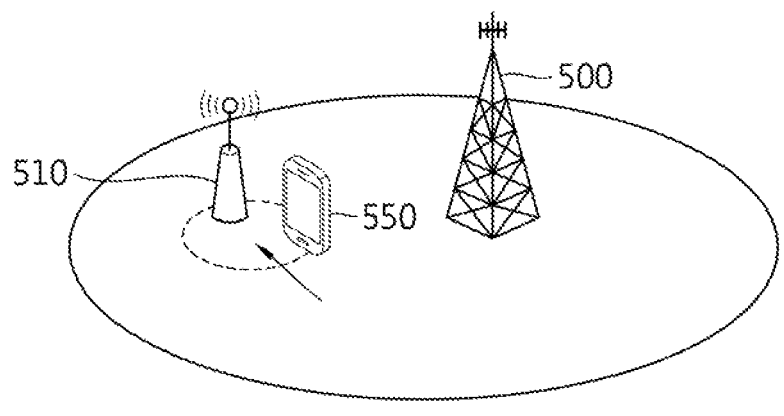
FIG. 5 is a diagram of dual connectivity configuration for a user equipment.

FIG. 5 is a diagram illustrating of dual connectivity for a user equipment.

As an example, FIG. 5 illustrates a case in which a UE 550 enters an overlapped area of a service area of a macro cell F2 of a master base station 500 and a service area of a small cell F1 of a secondary base station 510.

In this case, in order to support additional data services through the small cell F1 of the secondary base station 510 while maintaining an existing radio connection and a data service connection through the macro cell F2 of the master base station 400, the network configures a dual connectivity to the UE 550. Accordingly, user data arrived in the master base station 500 may be transmitted to the UE 550 through the secondary base station 510. More specifically, a frequency band of F2 is allocated to the master base station 500, and the frequency band of F1 is allocated to the secondary base station 510. The UE 550 may receive a service via the frequency band of the F1 from the secondary base station 510 while receiving a service via the frequency band of the F2 from the master base station 500. As described above, the master base station 500 utilizes the frequency band of the F2 and the secondary base station 510 utilizes the frequency band of the F1, but aspects of the present invention are not limited as such. Both the master base station 500 and the secondary base station 510 may utilized the same frequency band of the F1 or the F2.

Figure 6:
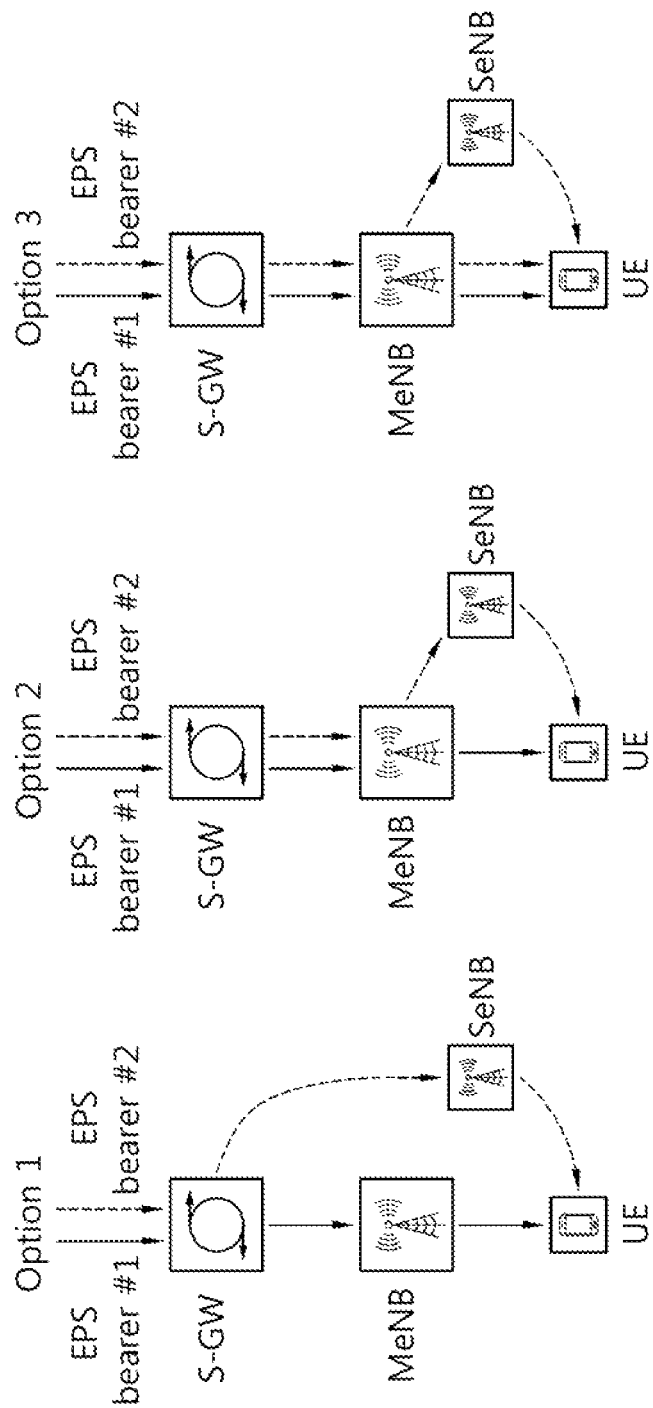
FIG. 6 is a diagram illustrating a user plane structure for dual connectivity.

FIG. 6 is a diagram illustrating a user plane structure for dual connectivity.

A UE, a master evolved NodeB (MeNB), and at least one secondary evolved NodeB (SeNB) may configure for dual connectivity. As shown in FIG. 6, there may be three options for a dual connectivity in accordance with a division scheme of user plane data. As an example, FIG. 6 illustrates concepts of the three different options with respect to a downlink transmission of user plane data.

OPTION 1: The S1-U interface has a master base station and a secondary base station as terminal nodes. In this option, each base station (MeNB and SeNB each) transmits downlink data via an EPS bearer configured for a UE (EPS bearer #1 for the MeNB, EPS bearer #2 for the SeNB). Since use plane data splits at a Core Network (CN), this option may be referred to as "CN split".

OPTION 2: The S1-U interface has only master base station as a terminal node. In this option, although the S1-U interface has only master base station as a terminal node, each base station is mapped with one bearer without splitting the bearers.

OPTION 3: The S1-U interface has only master base station as a terminal node. In this option, since a bearer splits, this may be referred to as "bearer split". According to the "bearer split" scheme, since one bearer splits into a plurality of base stations, data is divided into two or more flows and transmitted. Since data is delivered through a plurality of flows, the "bearer split" scheme may be referred to as a multi flow, multiple nodes (eNB) transmission, inter-eNB carrier aggregation, and the like.

With respect to a protocol structure, if the S1-U interface has only master base station as a terminal node (that is, in the case of OPTION 2 or OPTION 3), a protocol layer in a secondary base station may be required to support a segmentation or re-segmentation process. This is because a physical interface and the segmentation process are closely related and, a segmentation or re-segmentation process needs to correspond to the node transmitting RLC PDUs when a non-ideal backhaul is used. Accordingly, protocol structures for dual connectivity on the RLC layer or an upper layer may be configured based on the following considerations.

A. A configuration in which PDCP layers are independently exist in each base station: This configuration may be referred to as an independent PDCP type. In this configuration, each base station may utilize the existing LTE layer 2 protocol operations in a bearer. This configuration may be utilized in the above described OPTION 1, OPTION 2, and OPTION 3.

B. A configuration in which RLC layers are independently exist in each base station: This configuration may be referred to as an independent RLC type. In this configuration, the S1-U interface has only master base station as a terminal node, and a PDCP layer exist in the master base station only. In the "bearer split" (OPTION 3) scheme, a network and a UE has a separated RLC layer, and each RLC layer has an independent RLC bearer.

C. A configuration in which an RLC layer includes a 'master RLC layer' in a master base station and a 'slave RLC layer' in a secondary base station. This configuration may be referred to as a master-slave RLC type. In this configuration, the S1-U interface has only master base station as a terminal node. The master base station includes a PDCP layer and a part of an RLC layer (the master RLC layer), and a secondary base station includes another part of the RLC layer (the slave RLC layer). A UE includes one RLC layer that is paired with the master RLC layer and the slave RLC layer.

Accordingly, the dual connectivity configurations may vary in accordance with different combinations of the above mentioned options and types as following FIG. 7 to FIG. 11.

FIG. 7 to FIG. 11 are diagrams illustrating protocol structures of base stations in the case of downlink data transmission for a user plane.

Figure 7:
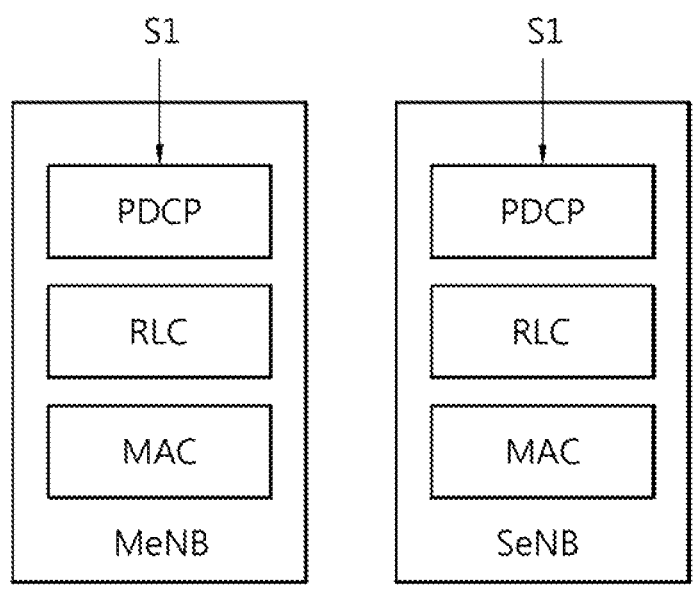
FIG. 7 to FIG. 11 are diagrams illustrating protocol structures of base stations in the case of downlink data transmission for a user plane.

Referring to FIG. 7, the S1-U interface has a master base station and a secondary base station as terminal nodes, and each base station has an independent PDCP layer (the independent PDCP type). In this configuration, each of the master base station and the secondary base station includes a PDCP layer, an RLC layer, and a MAC layer, and each base station transmits downlink data via the respective EPS bearer configured for a UE.

In this configuration, it may not be necessary for a master base station to buffer or process packets delivered by a secondary base station, and there may be an advantage that there is no, or insignificant, impact on RDCP/RLC and GTP-U/UDP/IP. Furthermore, there may be fewer requirements between backhaul link of a master base station and a secondary base station. There may be an advantage that a secondary base station can support local break-out and content caching for a UE connected by a dual connectivity function and a master base station does not need to route all traffics because a flow between a master base station and a secondary base station does not need to be controlled.

Figure 8:
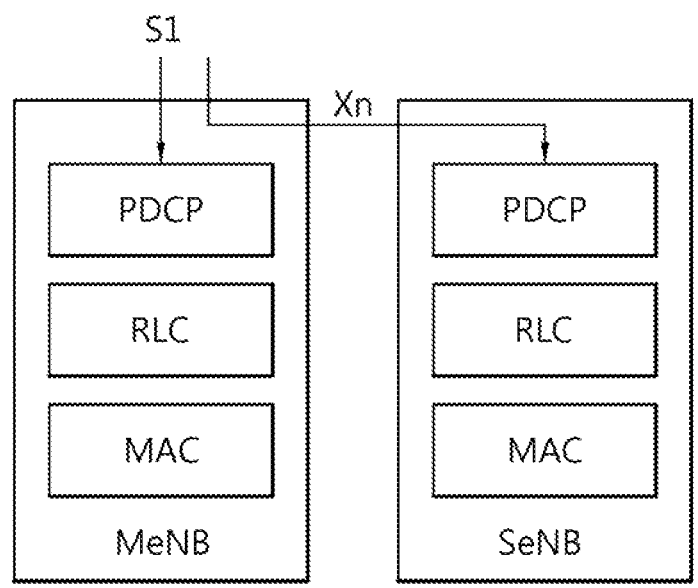

Referring to FIG. 8, the S1-U interface has only a master base station as terminal nodes, a bearer split is not performed, and PDCP layers independently exist in each base station (the independent PDCP type). In this case, PDCP layers, RLC layers and MAC layers exist in each master base station and secondary base station, while the PDCP layer of the master base station is linked to the PDCP layer of the secondary base station through Xn interface. Here, the Xn interface may be the X2 interface defined between the base stations in an LTE system.

Such case has the merit of the mobility of the secondary base station being hidden in the core network, has insignificant or no effect on RDCP/RLC and GTP-U/UDP/IP, and the processing gets limited to the packets being routed to the secondary base station without buffering.

Figure 9:
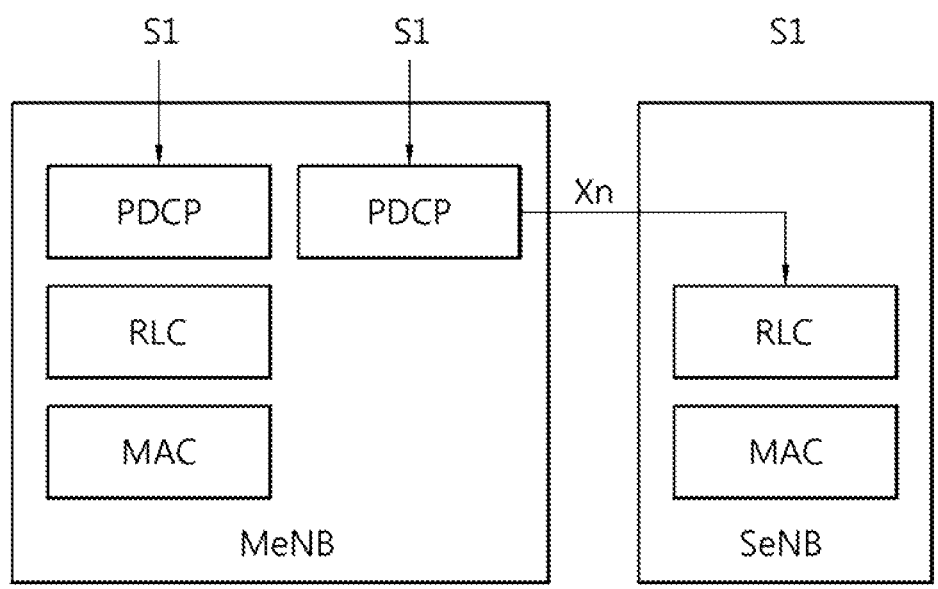

Referring to FIG. 9, the S1-U interface has only a master base station as terminal nodes, a bearer split is not happened, and RLC layers independently exist in each base station (the independent RLC type). In this case, a master base station has PDCP layers, RLC layers and MAC layers, while a secondary base station has only RLC and MAC layers. The PDCP layers of a master base station are separated as a bearer level, and one PDCP layer among them is connected to the RLC layer of a secondary base station through the Xn interface.

The merit of such case is that the mobility of the secondary base network is hidden in the core network, and there is no security effect requiring ciphering at the master base station. Also, the master base station can transfer the RLC processing to a secondary base station with little or no effect on RLC.

Figure 10:
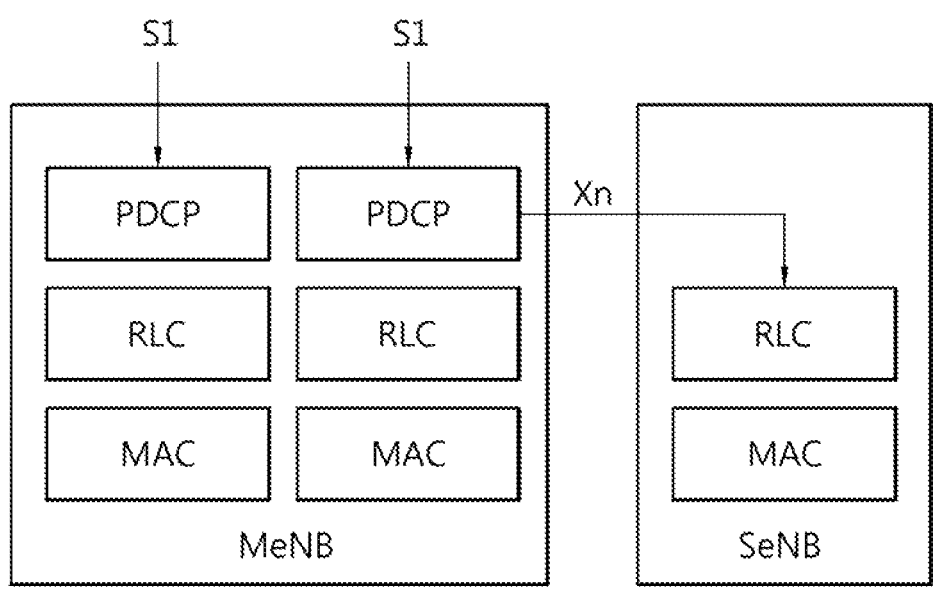

Referring to FIG. 10, the S1-U interface has only a master base station as terminal nodes, a bearer split is existed, and RLC layers independently exist in each base station (independent RLC type). In this case, a master base station has PDCP, RLC, and MAC layers, and a secondary base station has only RLC and MAC layers. Each of the PDCP, RLC and MAC layers of a master base station are separated as bearer level, one PDCP layer among them is connected to the RLC layer of a master base station and to the RLC layer of a secondary base station through Xn interface.

The merit of such case is that the mobility of a secondary base station is hidden in the core network, there is no security effect requiring ciphering at the master base station, and when a secondary base station changes there is no need for data forwarding between those secondary base stations. In addition, the master base station can transfer the RLC processing to a secondary base station with little or no effect on RCL, utilizing mobile resources through master base station and secondary base station for same bearer may be possible, and as a utilization of the master base station is possible while changing secondary base stations, there are fewer requirements for the mobility of a secondary base station.

Figure 11:
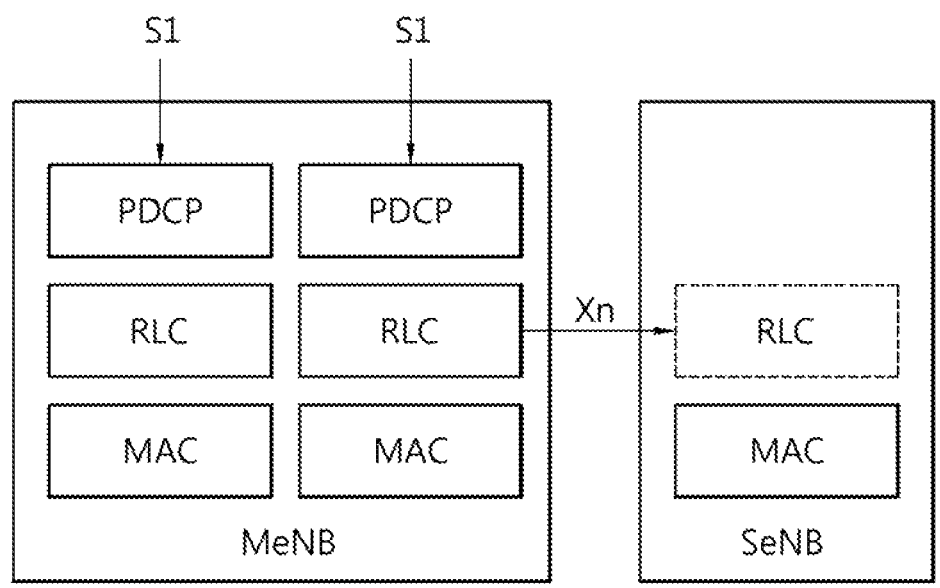

Referring to FIG. 11, the S1-U interface has only a master base station as terminal nodes, a bearer split is happened, and the RLC layer of a master base station is the master RLC layer, while the RLC layer of a secondary base station is the slave RLC layer (as master-slave RLC type). In this case, PDCP, RLC, and MAC layers exist in the maser base station, and only RLC and MAC layers exist in the secondary base station. Also, the PDCP, RLC, and MAC layers are each separated as bearer level, one RLC layer among them is connected to the RLC layer (slave layer) of a secondary base station as the master RLC layer through Xn interface.

The merit of such case is that the mobility of a secondary base station is hidden in the core network, there is no security effect requiring ciphering at the master base station, and when a secondary base station changes, there is no need for data forwarding between those secondary base stations. In addition, there is little or no effect on RLC, utilizing mobile resources through a master base station and a secondary base station for same bearer may be possible, and as the utilization of the master base station is possible while changing secondary base stations, there are fewer requirements for the mobility of a secondary base station. Also, the packet loss between a master base station and secondary base station can be covered by ARQ of RLC.

Hereinafter, an operation of activation and deactivation of a secondary serving cell in a carrier aggregation (CA) of a wireless communication system is described in more detail.

When a UE is configured for CA, the UE has one RRC connection with a network. This is also applicable when a dual connectivity is configured. For an establishment or a re-establishment of an RRC connection, or a handover process, a certain serving cell provides non-access stratum (NAS) mobility information, e.g., Tracking Area ID (TAI). Hereinafter, the certain serving cell may be referred to as a Primary Serving Cell (PCell). The PCell may include a Downlink Primary Component Carrier (DL PCC) and an Uplink Primary Component Carrier (UL PCC) as a pair.

Secondary serving cell (refer to "Scell") and the PCell may be included in a group of serving cells according to UE capability, such as a hardware capability of a UE. A secondary serving cell may be configured to include Downlink Secondary Component Carrier (DL SCC) only, or may be configured to include DL SCC and Uplink Secondary Component Carrier (UL SCC) as a pair.

A set (group) of serving cells may be configured to include a PCell and at least one SCell, or at least one SCell only. The PCell may be changed only by a handover procedure, and may be used for transmitting a PUCCH. The PCell is not changed to a deactivated state, but a secondary serving cell may be changed to a deactivated state.

An RRC re-establishment procedure may be triggered if a Radio Link Failure (RLF) of a PCell experiences, but, it may not be triggered if a Radio Link Failure (RLF) of a Secondary Serving Cell experiences.

A configuration or a re-configuration of a secondary serving cell into a serving cell group or a release of the secondary serving cell from the serving cell group may be performed through an RRC reconfiguration procedure, which is a dedicated signaling. If a new secondary serving cell is configured into a serving cell group, System information of the new secondary serving cell is transmitted in a RRC reconfiguration message. Accordingly, a monitoring process is not necessary for the change of system information of a secondary serving cell.

As described above, when a UE is configured for a CA, an activation/deactivation mechanism for secondary serving cell is supported to optimize the battery consumption of the UE. If a secondary serving cell is in a deactivated state, the UE does not need to receive PDCCH or Physical Downlink Shared CHannel (PDSCH) corresponding to the secondary serving cell and the UE cannot perform any uplink transmission via the corresponding secondary serving cell. Also the UE may not measure a Channel Quality Indicator (CQI) measurement operation. In contrast, if a secondary serving cell is in an activated state, the UE may receive the PDCCH and the PDSCH. Here, the reception is performed if UE is configured to monitor the PDCCH for the secondary serving cell. In addition, the UE may perform a CQI measurement operation.

The activation/deactivation mechanism is performed based on a combination of a MAC Control Element (CE) and a deactivation timer. A MAC CE indicates activation/deactivation state of each secondary serving cell by a bit, the '0' indicates deactivation and the '1' indicates activation. The MAC CE may independently indicate an activation/deactivation state of each secondary serving cell through a bit corresponding to the respective secondary serving cell, and the indication may be configured as a bitmap form.

Although a deactivation timer is configured and maintained for each secondary serving cell, all secondary serving cells have a same value for the each deactivation timer. The value of the deactivation timer may be configured by an RRC signaling.

If a UE receives an RRC re-configuration message not including Mobility Control Information (MCI), wherein the RRC re-configuration message includes that secondary serving cell is added, an initial state of the secondary serving cell is 'deactivation' state. In case, the secondary serving cell is not changed or not re-configured by the RRC re-configuration message, it may maintain an activation state or a deactivation state without changing the state.

Whereas, if a UE receives an RRC re-configuration message including MCI, i.e., a handover process, all secondary serving cells may be changed to 'deactivation' states.

Figure 12:
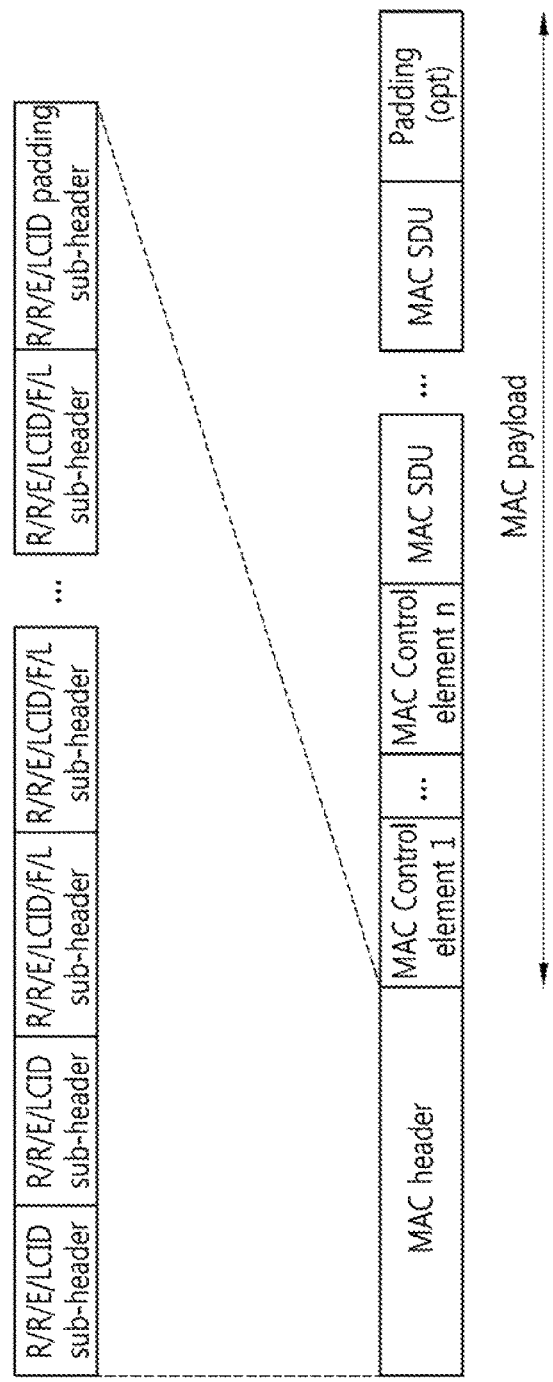
FIG. 12 is a diagram illustrating a structure of a Medium Access Control Protocol Data Unit (MAC PDU).
Figure 13:
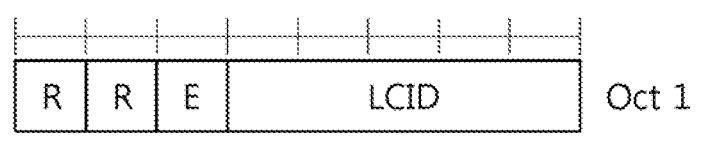
Figure 14:
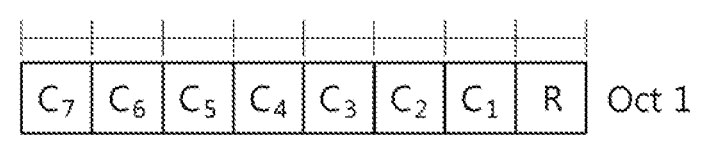

FIG. 12 is a diagram illustrating a structure of a Medium Access Control Protocol Data Unit (MAC PDU), FIG. 13 is a diagram illustrating a structure of a MAC subheader, and FIG. 14 is a diagram illustrating a structure of a MAC Control Element (CE). With reference to FIG. 12 to FIG. 14, the structure of MAC CE will be described in more detail.

FIG. 12 illustrates a structure of a MAC PDU that is used in a Downlink Shared CHannel (DL-SCH) transmission and an Uplink Shared CHannel (UL-SCH) transmission. As shown in FIG. 12, a MAC PDU may include one MAC header, 0 or at least one MAC CE, 0 or at least one MAC SDU, and padding. Here, the MAC header and the MAC SDU may have variable lengths and the padding may be optionally included in the MAC PDU.

The MAC header may include one or more sub-headers. Each of the sub-headers corresponds to a MAC SDU, a MAC CE, or a padding of the PAC PDU. That is, an order of sub-headers of a MAC PDU corresponds to an order of the corresponding MAC SDU, MAC CE, and padding.

The MAC CE for activation/deactivation of a serving cell corresponds to a sub-header type shown in FIG. 13 (R/R/E/LCID type). In FIG. 13, 'R' is a reserved bit and is not used for other purposes, 'E' is a bit that indicates whether the sub-header includes additional 8 bits. "LCID" represents logical information for a MAC SDU or MAC CE corresponding to the sub-header.

As an example, an LCID value for a downlink shared channel may be defined as shown in Table 1 below.

TABLE 1

| Index | LCID values |
| --- | --- |
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

Referring to Table 1, the LCID value for activation/deactivation of serving cell(s) is set as '11011'. Accordingly, the MAC CE that corresponds to the sub-header in a MAC PDU having '11011' as an LCID value is interpreted as shown in FIG. 14.

FIG. 14 illustrates a structure of a MAC CE having a fixed length of 8-bit. In FIG. 14 $C_1$ field indicates activation/deactivation status of a secondary serving cell(s) with an ScellIndex '1' if there is the secondary serving cell configured with the ScellIndex '1'. Similarly, $C_2$ field indicates activation/deactivation status of a secondary serving cell having an ScellIndex '2' if there is the secondary serving cell configured with the index '2'. Here, the UE may ignore a field of a secondary serving cell that is not configured to the UE. The $C_i$ field is set to "1" to indicate that the SCell with SCellIndex i shall be activated and the $C_i$ field is set to "0" to indicate that the SCell with SCellIndex i shall be deactivated. The 'R' is a reserved bit and is always set as '0'.

Figure 15A:
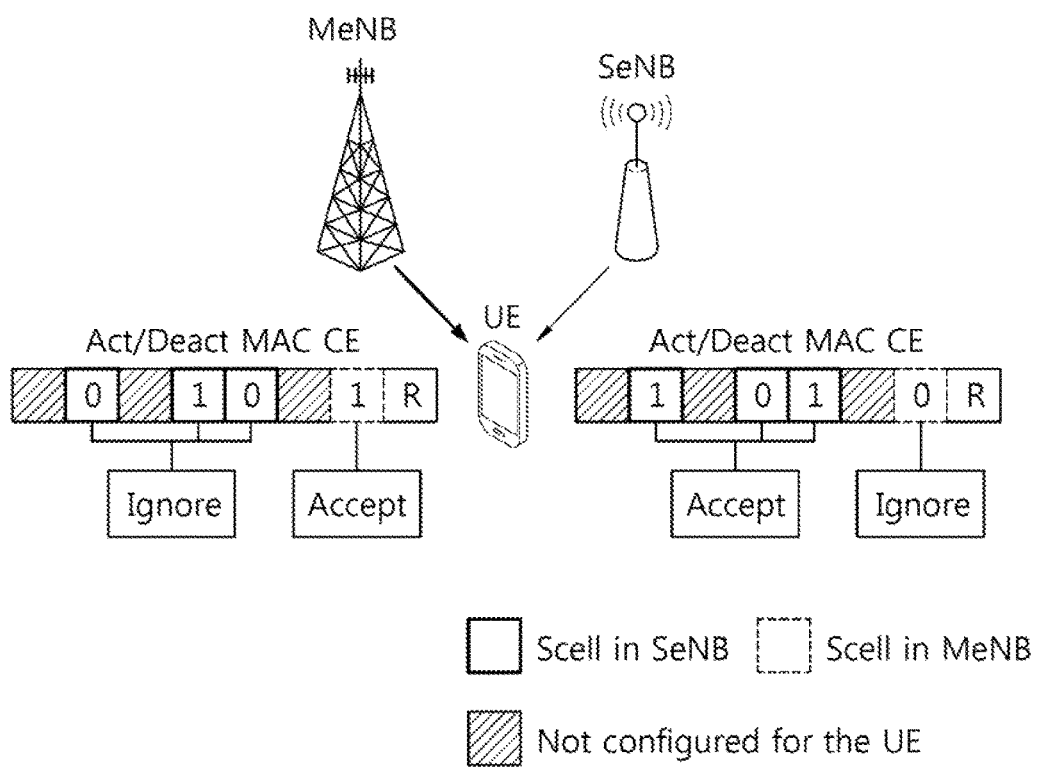
FIG. 15A is a diagram for transmitting activation/deactivation information of serving cells according to an exemplary embodiment of the present invention.

FIG. 15A is a diagram illustrating a method of transmitting activation/deactivation information of secondary serving cells according to an exemplary embodiment of the present invention.

If a UE is configured for dual connectivity by a master base station and a secondary base station, the UE may receive activation/deactivation MAC CE messages each via a primary serving cell or a secondary serving cell involved with the base stations each. Hereinafter, an activation/deactivation MAC CE message received from a master base station (MeNB) may be referred to as a first activation/deactivation MAC CE message, and a activation/deactivation MAC CE message received from a secondary base station (SeNB) may be referred to as a second activation/deactivation MAC CE message.

In this case, as shown in FIG. 15A, the UE identifies and applies information about activation/deactivation indicator(s) of secondary serving cell(s) involved with the MeNB, and ignores information about activation/deactivation indicator(s) for secondary serving cell(s) involved with the SeNB, from the first activation/deactivation MAC CE message. Also, the UE identifies and applies information about activation/deactivation indicator(s) for secondary serving cell(s) involved with the SeNB, and ignores information about activation/deactivation indicator(s) for secondary serving cell(s) involved with the MeNB, from the second activation/deactivation MAC CE message.

As described above, the UE can determine that a secondary serving cell configured for the UE is associated with which of the eNBs, that is, the UE identifies which eNB configures with each of the secondary serving cells for the UE in order to selectively apply or ignore activation/deactivation indicators of secondary serving cells in the activation/deactivation MAC CE message. For this, the UE may utilize Timing Advance Group (TAG) as an example. A TAG can be a serving cell group for including a cell (or cells), which uses the same Timing Advance value and the same timing reference, or a timing reference cell including the timing reference among the cell(s) that uplink (UL) are configured.

For example, if a first serving cell and a second serving cell belong to TAG1 and the second serving cell is a timing reference cell, the same Timing Advance value TA1 is applied to the first serving cell and the second serving cell and the first serving cell applies the TA1 value with reference to a downlink synchronization timing of a downlink component carrier (DL CC) of the second serving cell. If the first serving cell and the second serving cell belong to TAG1 and TAG2, respectively, the first serving cell may be a timing reference cell in the TAG1 and the second serving cell may be a timing reference cell in the TAG2 and different Timing Advance values of TA1 and TA2 may be applied to the first serving cell and the second serving cell, respectively. TAG may include a primary serving cell, at least one secondary serving cell, or the primary serving cell and at least one secondary serving cell. As described above, because serving cells are distinguished based on a TAG unit, serving cells in different TAGs are provided by different base stations.

A TAG may be classified into a primary Timing Advance Group (pTAG) and a secondary Timing Advance Group (sTAG). A pTAG is a TAG including a primary serving cell, and a sTAG is a TAG including only secondary serving cells. Accordingly, a UE may recognize that secondary serving cells included in the pTAG are secondary serving cells provided by a MeNB, and that secondary serving cells included in the sTAG are secondary serving cells provided by a SeNB. Here, the sTAG may also include a sTAG having only SCells provided by a MeNB, among sTAGs. Accordingly, a UE may receive, from the MeNB, information about an sTAG including secondary serving cells provided by the MeNB and utilize the information so that the UE identifies sTAGs including secondary serving cells provided by the MeNB, form sTAGs including secondary serving cells provided by a SeNB. The information about a sTAG including secondary serving cells provided by the MeNB may be transmitted via an RRC message. For the RRC message transmission, a network or an RRC layer of the master base station may perform an RRC re-configuration procedure.

As described, the UE can determine that a secondary serving cell is configured for which a base station, either a MeNB or a SeNB by using the TAG as an example, with respect to each of the secondary serving cells configured for the UE. Therefore, the UE may selectively apply or ignore activation/deactivation indicators for SCells of included in each activation/deactivation MAC CE message when the UE receives activation/deactivation MAC CE messages respectively from a MeNB and a SeNB in dual connectivity.

More details, as shown in FIG. 15A, a master base station contains a secondary serving cell (SCell) having an SCellIndex 1 and a secondary base station contains SCells with an SCellIndex 3, 4, and 6, respectively. In this case, the UE may only recognize information about activation/deactivation indicator for the SCell having the SCellIndex 1 from a first activation/deactivation MAC CE message by using information (i.e. about aTAG) including SCells involved by the MeNB and ignore information about activation/deactivation indicators for the SCells having the SCellIndexes 3, 4, and 6 involved by the SeNB, when the UE receives the first activation/deactivation MAC CE message.

In the same way, the UE may only recognize information about activation/deactivation indicators for the SCells having the SCellIndexes 3, 4, and 6 from the second activation/deactivation MAC CE message by using the information (i.e. about a TAG) including SCells involved by the SeNB, herein the information (about TAG) is provided by the master base station, and ignore information about activation/deactivation indicator for the SCell having the SCellIndex 1 involved by the master base station, when the UE receives the second activation/deactivation MAC CE message. The RRC signaling from the master base station includes the information of SCells in which base station configures.

Further, a base station may inform UE information about which base station provides a SCell by an RRC message. In this case, the RRC message may include information about each base station that configures SCell for the UE, with respect to each SCell configured for the UE. In this case, the RRC message may not include information about a base station (i.e. master base station) that provides the PCell since the PCell is involved by the master base station.

Therefore, the UE can identify which base station configures a SCell for the UE, with respect to each SCell configured for the UE, based on the information included in the RRC message even though the UE receives multiple activation/deactivation MAC CE messages. Thus, the UE may selectively apply or ignore activation/deactivation indicators for SCells included in each activation/deactivation MAC CE message.

Figure 15B:
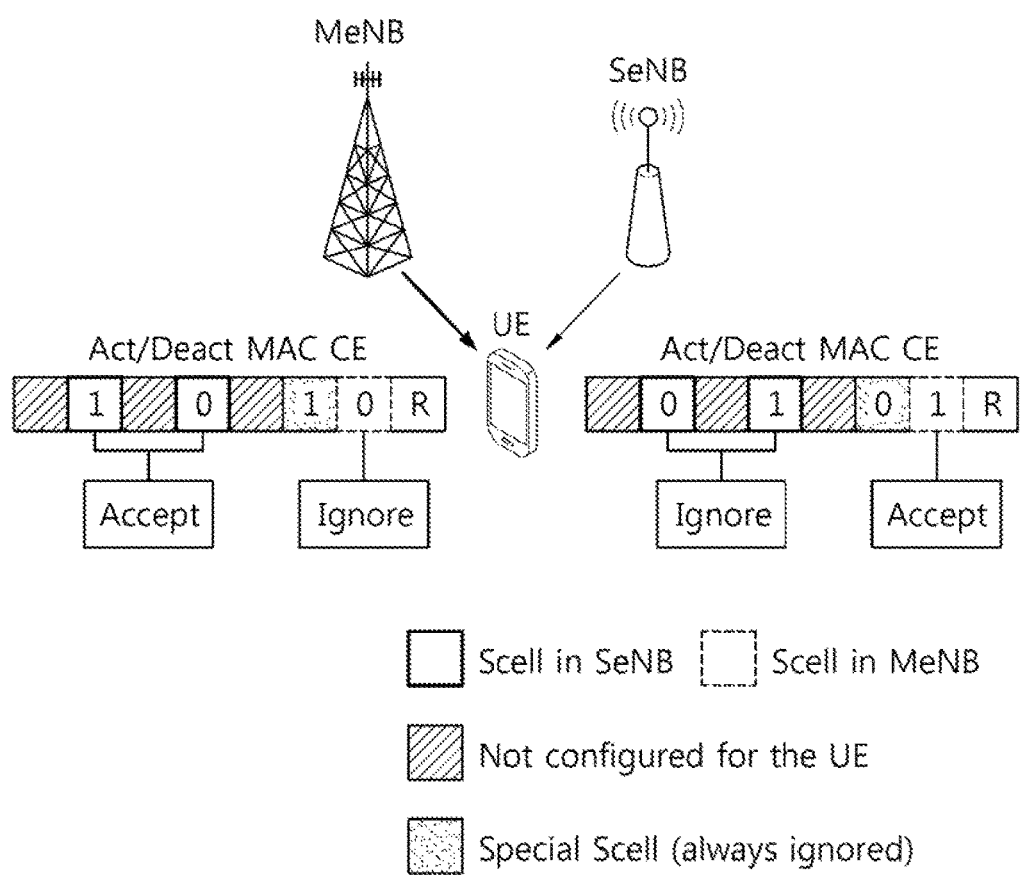
FIG. 15B is a diagram for transmitting activation/deactivation information when a special serving cell has the same activation characteristics like a primary serving cell according to an exemplary embodiment of the present invention.

As shown in FIG. 15B, the UE may ignore a bit indicating activation/deactivation for the SCell in which PUCCH is configured, included in an activation/deactivation MAC CE message in a case where the SCell in which PUCCH is configured has the same activation/deactivation characteristics like a PCell. The SCell in which PUCCH is configured may be referred to as a "special SCell".

SCellIndexes of the UE provided by base stations each connected to the UE in the dual connectivity function may be assigned independently. For example, the PCell provided by the master base station may have a SCellIndex 0, and a SCells provided by the master base station may have a SCellIndex 1 to 7. Otherwise, a SCellIndex 0 may be assigned in a SCell which is provided by a secondary base station and in which PUCCH is configured, and SCellIndex 1 to 7 may be assigned in SCell provided by the secondary base station, and in which PUCCH is not configured.

Figure 15C:
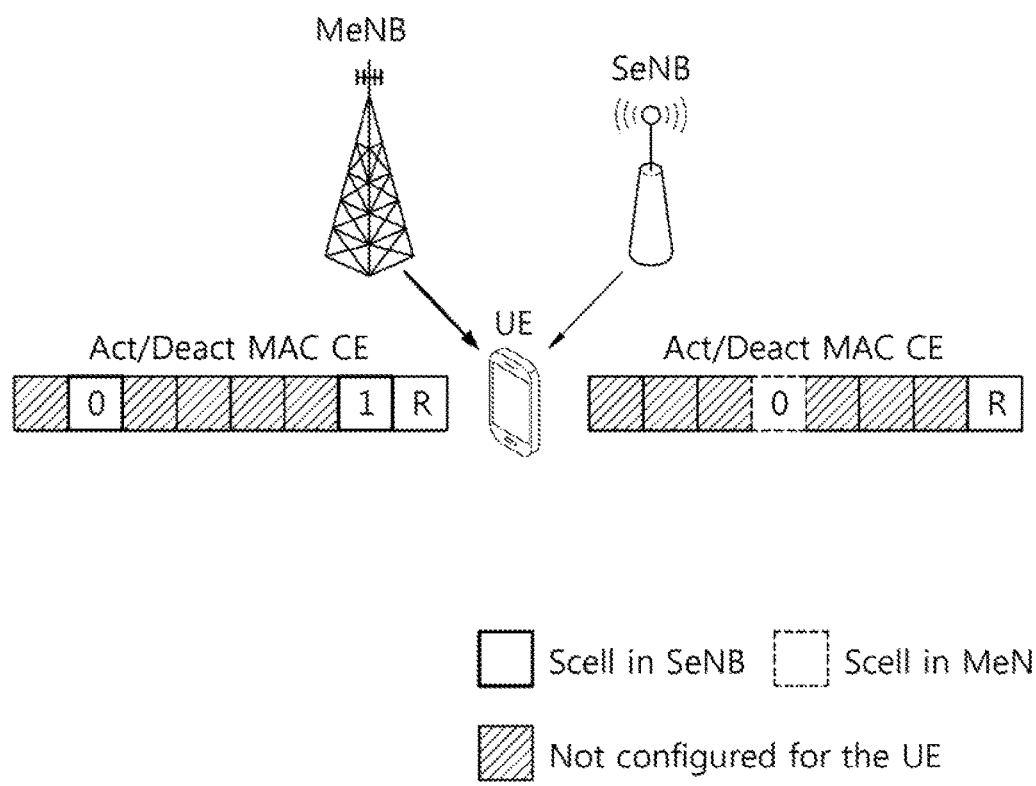
FIG. 15C is a diagram for transmitting activation/deactivation information of serving cells according to another exemplary embodiment of the present invention.

As described above, in a case where SCellIndexes are independently assigned by each base station, an activation/deactivation message format and a method of receiving and applying activation/deactivation messages by a UE may be configured as follows:

As shown in FIG. 15C, a UE may identify and apply information of activation/deactivation indicators for SCells through the first activation/deactivation MAC CE message as described above. Similarly, the UE may recognize and apply information about activation/deactivation indicators for secondary serving cells provided through the second activation/deactivation MAC CE message as described above.

In other words, the UE may only recognize information about activation/deactivation indicator for the SCell involved by a master base station and ignore information about activation/deactivation indicators for the SCells involved by other base station after receiving the first activation/deactivation MAC CE message. Also, the UE may only recognize information about activation/deactivation indicator for the SCell involved by a secondary base station and ignore information about activation/deactivation indicators for the SCells involved by other base station after receiving the second activation/deactivation MAC CE message. Here, the UE has received the RRC message including configuration information of SCells that indicates which base station configures which SCell, and the UE receives the RRC message from the master base station.

Meanwhile, the secondary base station cannot deactivate a SCell in which PUCCH is configured. Here, a LSB (Least Significant Bit) corresponding a location bit indicating an SCellIndex which is provided by the secondary base station and in which PUCCH is configured, can be defined as a reserved bit. Also the SCell in which PUCCH is configured may have same features for activation/deactivation characteristic like PCell in the master base station and the SCell in which PUCCH is configured may be defined as same name like the PCell.

Figure 16:
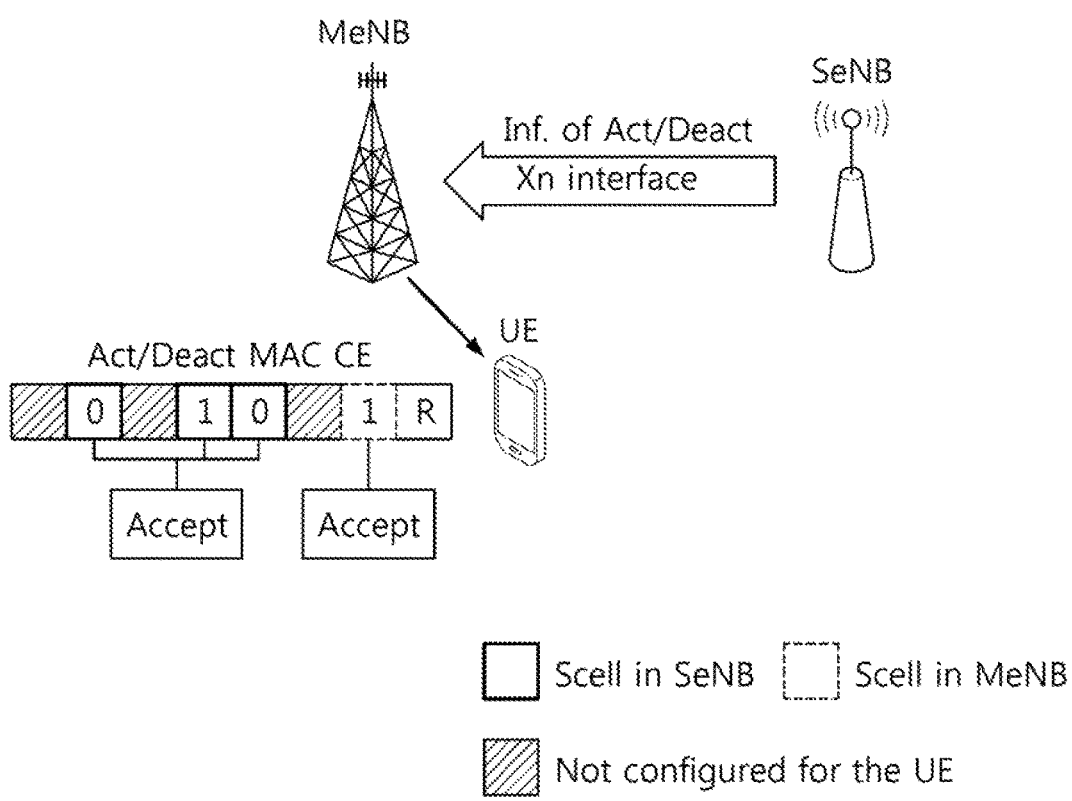
FIG. 16 is a diagram for transmitting activation/deactivation information of serving cells according to still another exemplary embodiment of the present invention.

FIG. 16 is a diagram of transmitting activation/deactivation information of secondary serving cells according to another exemplary embodiment of the present invention.

If a UE is connected in dual connectivity function with a plurality of base stations, the UE may receive an activation/deactivation MAC CE message from a master base station through a PCell or a SCell involved with the master base station. In this case, a MAC scheduler of a secondary base station may inform information about status of change of SCell(s) to the master station when activation/deactivation statuses for SCells involved with a secondary base station are changed, as shown in FIG. 16. Here, the secondary base station may transmit the activation/deactivation information for SCells involved with the secondary base station to the master base station through a MAC CE message, or a message format determined by X2 or Xn interface.

The master base station may configure a MAC CE message by aggregating activation/deactivation information for SCells involved with the master base station and the activation/deactivation information received from the secondary base station and, may transmit the MAC CE message to the UE.

When the master base station transmits an activation/deactivation MAC CE message for SCells involved with the master base station, the master base station can confirm whether an activation/deactivation for SCells involved with a secondary base station which is connected with the UE in the dual connectivity function is changed or not.

Further, the master base station may check expiration of deactivation timers for SCells involved with a secondary base station. For example, the master base station may recognize the expiration time of the deactivation timers each for the SCells involved by the secondary base station by synchronizing an operation of the deactivation timers for the SCells belonged d by the secondary base station with the UE. Accordingly, if a SCell in the secondary base station transfer into a deactivated status because of expiration a deactivation timer of the SCell, the master base station may control to deactivate the SCell of the UE by setting to '0' of activation/deactivation status for the SCell, without receiving any information from the secondary base station.

Further, if the secondary base station changes a value of a deactivation timer for each SCell involved with the secondary base station, the secondary base station may transmit the changed value of the deactivation timer to the master base station. That is, the SCells in the secondary base station and SCells in the master base station have different deactivation timer values.

According to other aspects, the master base station may not define an operation of a deactivation timer for SCells belonged in the secondary base station. In this case, a UE receives one deactivation timer value per UE from the master base station, and the UE controls that the deactivation timer value is applied to only SCells involved with the master base station. The deactivation timer for SCell involved in the second base station may not be defined or may be fixed with infinite value. Accordingly, the master base station may maintain the activation information for SCells involved with the secondary base station and transmit the maintained activation information to the UE until when the master base station receives information indicating status of activation/deactivation changed of SCells involved with the secondary base station from the secondary base station.

Figure 17:
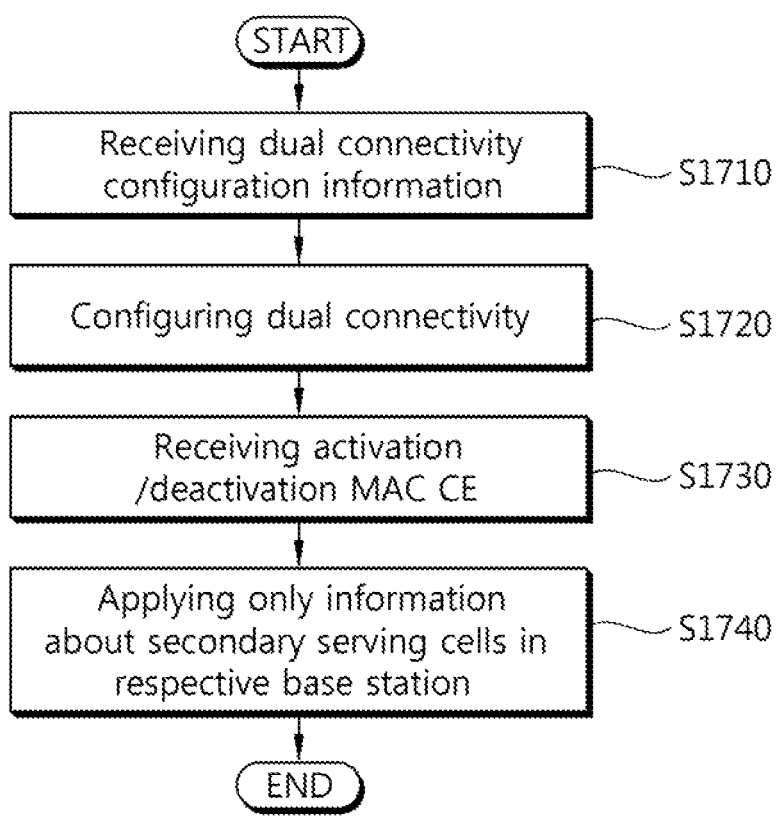
FIG. 17 is a diagram for receiving activation/deactivation information of serving cells by a user equipment according to an exemplary embodiment of the present invention.

FIG. 17 is a diagram of UE for receiving activation/deactivation information of secondary serving cells according to an exemplary embodiment of the present invention.

If a UE exists, herein the UE has capability of a dual connectivity function with having a master base station transmits and a secondary base station, the master base station transmits dual connectivity configuration information to the UE through an RRC message.

If the UE receives the RRC message including the dual connectivity configuration information (S1710), the UE configures a dual connectivity with the master base station and the secondary base station based on the received dual connectivity configuration information (S1720). Here, the RRC message may include information about a sTAG including SCells provided by the master base station, or information about which SCell is involved with which base station. It can include SCell configuration information for each base station so that the UE can determine that a SCell is configured by which base station, for example, Scell information by each base station, based the information including SCell configuration per a base station in the RRC message. If a dual connectivity is configured for the UE, the UE may set a selective application mode for selectively applying activation/deactivation information for SCells included in the first activation/deactivation MAC CE message and activation/deactivation information for SCells included in the second activation/deactivation MAC CE message.

If the UE receives activation/deactivation MAC CE messages from each of the base stations, respectively (S1730), the UE determines which base station involves which SCell configured in the UE, with respect to each SCell of the UE, based on the SCell information included in the RRC message. Then, in accordance with the determination, the UE selectively applies activation/deactivation information for SCells included in the master base station from the first activation/deactivation MAC CE message and ignores activation/deactivation information of other SCells belong to other base station from the first activation/deactivation MAC CE message. Also, the UE selectively applies activation/deactivation information for SCells included by the secondary base station from the second activation/deactivation MAC CE message and ignores activation/deactivation information of other SCells belong to other base station from the second activation/deactivation MAC CE message (S1740).

More specifically, for the dual connectivity, the UE checks SCell configuration information of each eNB when the UE receives a RRC message from MeNB, wherein the RRC includes the SCell configuration information of each eNB. That is, the UE determines a SCell or SCells of MeNB as a first SCell group and a SCell or SCells of SeNB as a second SCell group from the RRC message. Then, the UE receives a MAC message of own SCell(s) from each eNB which is composed and sent independently for the UE.

For example, the UE checks an activation/deactivation MAC CE transmitted by the MeNB identified as a first MAC message, and determines activation/deactivation MAC CE including status of activation and deactivation of the first SCell group of the MeNB. Also the UE checks an activation/deactivation MAC CE transmitted by the SeNB identified as a second MAC message, and determines activation/deactivation MAC CE including status of activation and deactivation of the second SCell group of the SeNB.

Based on the above configuration, the UE can selectively apply activation/deactivation indicator of SCell as per eNB, based on the SCell configuration and its own MAC message of each eNB in dual connectivity since each of the eNBs can maintain the original MAC message format of activation/deactivation MAC Control Element (CE), and transmit the activation/deactivation MAC CE to the UE.

Figure 18:
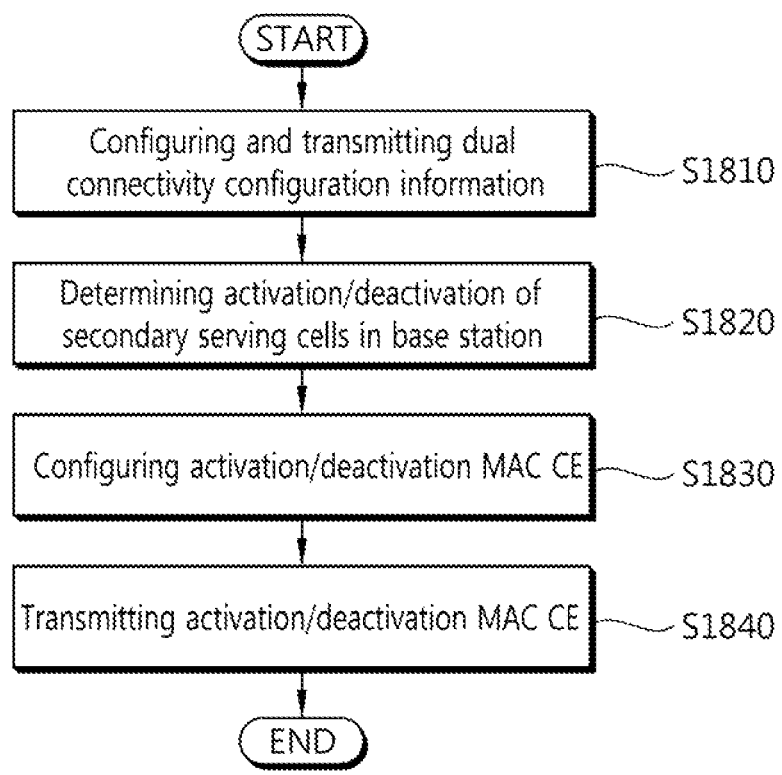
FIG. 18 is a diagram for transmitting activation/deactivation information of serving cells by a base station according to an exemplary embodiment of the present invention.

FIG. 18 is a diagram for transmitting activation/deactivation information of SCells by a eNB according to an exemplary embodiment of the present invention.

Referring to FIG. 18, if a UE capable of configuring a dual connectivity exists, a base station configures dual connectivity configuration information for the UE and transmits the dual connectivity configuration information to the UE, herein the base station may be a MeNB (S1810). The dual connectivity configuration information may be transmitted to the UE through an RRC message, and the RRC message may include information about a sTAG including SCells included by the MeNB and, sTAG including SCells included by the SeNB, or information about which base station provides which SCell.

Base stations each for the dual connectivity determines activation or deactivation of SCell (s) provided by the base station (S1820), and in accordance with the determination, the base station each configures activation/deactivation MAC CE that indicates activation or deactivation of each of the SCell(s) (S1830). Then, the base station each transmits, to the UE, the configured activation/deactivation MAC CE message (S1840).

More specifically, for the dual connectivity, the MeNB checks a SCell or SCells of MeNB as a first SCell group, and configures and sends activation/deactivation MAC CE including status of activation and deactivation of the first SCell group. The activation/deactivation MAC CE from the MeNB can be called a first MAC message. Also the SeNB checks a SCell or SCells of SeNB as a second SCell group, and configures and sends activation/deactivation MAC CE including status of activation and deactivation of the second SCell group. The activation/deactivation MAC CE from the SeNB can be called a second MAC message. As described, the each eNB can compose and send MAC message of own SCell(s) independently to the UE.

After receiving a message including the activation/deactivation MAC CE, the UE determines which base station provides which SCell configured in the UE, with respect to each SCell configured in the UE, based on the received information in the RRC message, and in accordance with the determination, the UE may selectively apply activation/deactivation information about SCell(s) provided by the base station, which transmitted the MAC message, among information about activation/deactivation indicators for SCells included in the activation/deactivation MAC CE message.

For these reasons, each of the eNBs can maintain the original MAC message format of activation/deactivation MAC Control Element (CE), and transmit the activation/deactivation MAC CE to the UE. So the base station may independently transmit the activation/deactivation MAC CE. According to aspects of the present invention, independent operation of MAC scheduler each without additional information exchanges between MeNB and SeNB, so that the UE can selectively apply activation/deactivation indicator of SCell each based on the Scell configuration and its own MAC message of each eNB.

Figure 19:
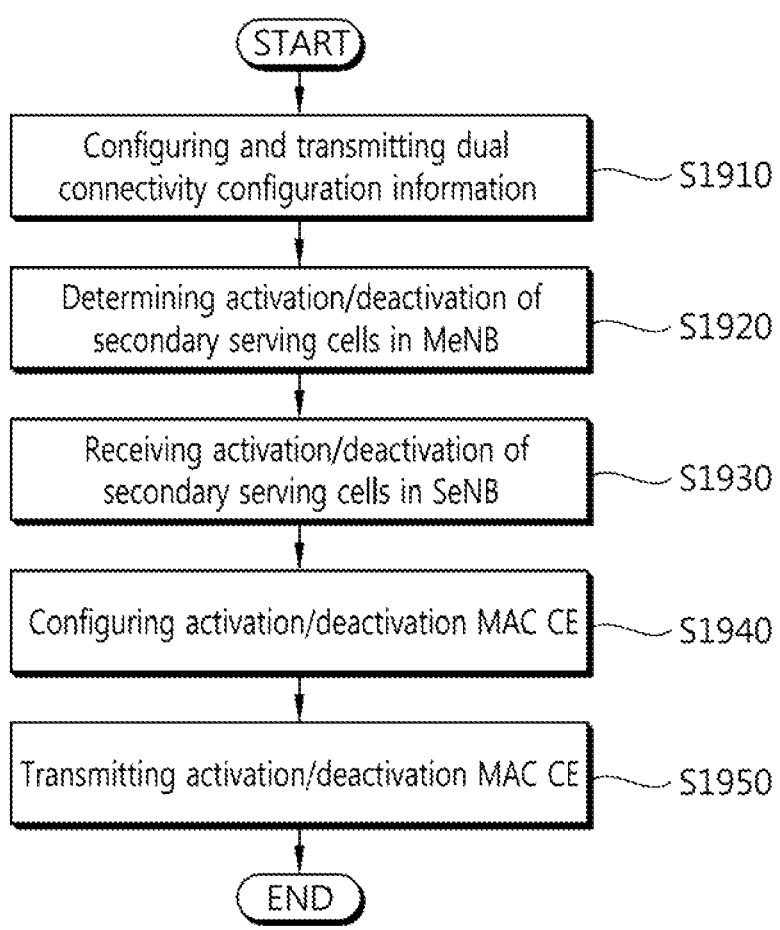
FIG. 19 is a diagram for transmitting activation/deactivation information of serving cells by a master base station according to an exemplary embodiment of the present invention.

FIG. 19 is a diagram for transmitting activation/deactivation information of secondary serving cells by a MeNB according to an exemplary embodiment of the present invention.

Referring to FIG. 19, if a UE capable of configuring a dual connectivity exists, a MeNB configures dual connectivity configuration information for the UE and transmits the dual connectivity configuration information to the UE (S1910).

Then, the MeNB determines activation of deactivation of SCell(s) involved with the MeNB (S1920). The MeNB receives activation/deactivation information for SCell(s) involved with the SeNB from SeNB which is connected to the UE for the dual connectivity function (S1930). Based on the determination, the MeNB configures activation/deactivation MAC CE (S1940). The MeNB transmits a message including the configured activation/deactivation MAC CE to the UE (S1950).

Here, a MAC scheduler of the SeNB may transmit, to the MeNB, activation/deactivation information for SCell(s) provided by the SeNB if status of the SCell(s) provided by the SeNB is changed. Further, the MeNB may confirm whether the activation/deactivation status for the SCell(s) provided by the SeNB is changed when if the MeNB determines to transmit an activation/deactivation MAC CE message for SCell(s) provided by the MeNB.

The activation/deactivation information for SCell(s) involved by the SeNB may be transmitted to the MeNB in the MAC CE message format or in a message format determined in X2 or Xn interface.

Further, the MeNB may recognize the expiration time of the deactivation timer for the SCell(s) provided by the SeNB by synchronizing an operation of the deactivation timer for the SCell(s) provided by the SeNB with the UE. In this case, when a SCell in the SeNB falls into a deactivated state by an expiration of the deactivation timer, the MeNB may control to deactivate the SCell by setting activation information for the SCell to zero without receiving any information from the SeNB. If the SeNB changes a value of the deactivation timer for each SCell provided by the SeNB, the SeNB may transmit value of the deactivation timer changed to the MeNB.

Figure 20:
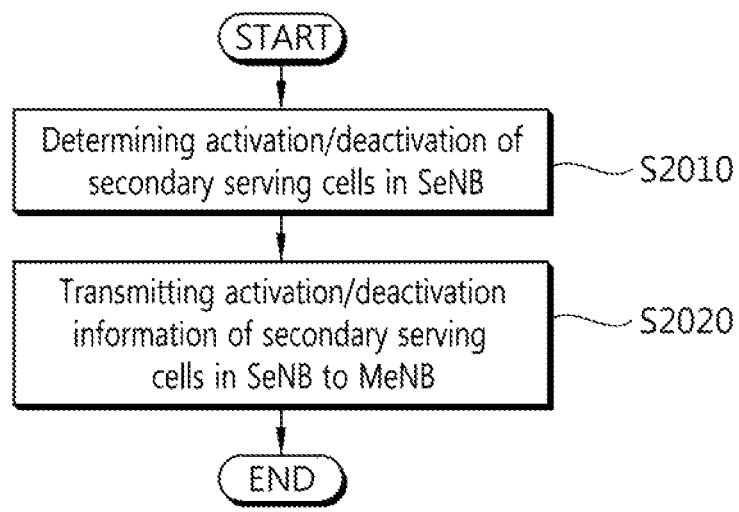
FIG. 20 is a diagram for transmitting activation/deactivation information of serving cells by a secondary base station according to an exemplary embodiment of the present invention.

FIG. 20 is a diagram for transmitting activation/deactivation information of SCells by the SeNB according to an exemplary embodiment of the present invention.

A SeNB, which is connected to a UE with a MeNB in a dual connectivity function, determines activation or deactivation of SCell(s) involved with the SeNB (S2010), and in accordance with the determination, the SeNB transmits activation/deactivation information for SCell(s) provided by the SeNB, to the UE or MeNB (S2020).

Here, a MAC scheduler of the SeNB may transmit activation/deactivation information for SCell(s) provided by the SeNB to the MeNB or the UE, if an activation/deactivation status of the SCell(s) provided by the SeNB is changed or if the SeNB receives a confirmation request for confirming whether a status of activation/deactivation for Scell(s) provided by the SeNB is changed from the MeNB. Here, the activation/deactivation information for Scell(s) provided by the SeNB may be transmitted to the UE with the MAC CE message format or a message format determined in X2 or Xn interface to MeNB.

An operation of the deactivation timer for SCell(s) provided by the SeNB may be synchronized with the UE so that the MeNB can recognize the expiration time of the deactivation timer for the SCell(s) provided by the SeNB in respect to each SCell provided by the SeNB. And the SeNB may transmit, value of the deactivation timer changed to the MeNB when the SeNB changes a value of a deactivation timer for a SCell provided by the SeNB.

Figure 21:
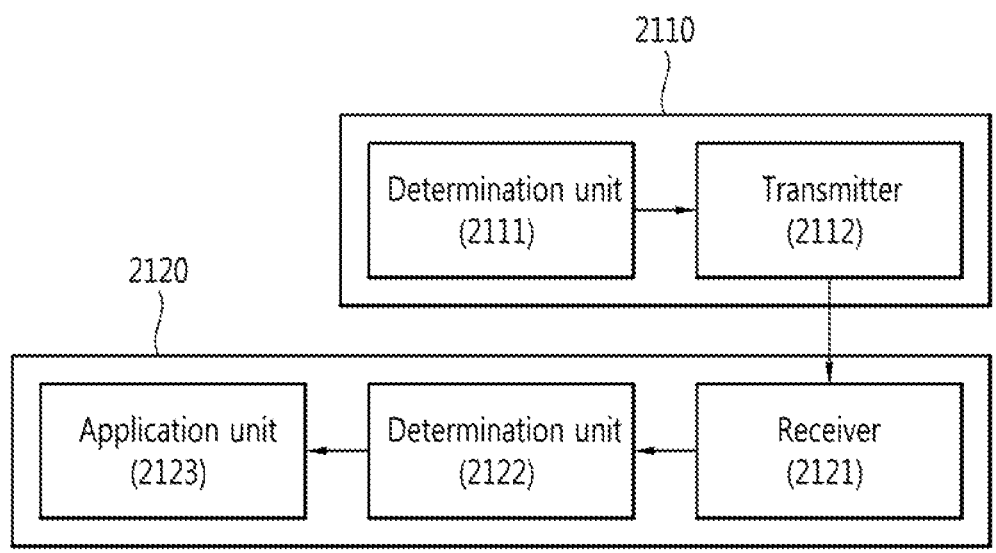
FIG. 21 is a diagram for a transmission device and a reception device for the activation/deactivation information of serving cells according to an exemplary embodiment of the present invention.

FIG. 21 is a block diagram of device for transmitting and receiving activation/deactivation information of SCells according to an exemplary embodiment of the present invention.

In accordance with exemplary embodiments of the present invention, a transmission device 2110 that transmits activation/deactivation information for SCell(s) may be an eNB or a part of the eNB, and a reception device 2120 that receives the activation/deactivation information for SCell(s) may be a UE or a part of a UE.

Referring to FIG. 21, the transmission device 2110 that transmits activation/deactivation information for SCell(s) includes a determination unit 2111 and a RF unit 2112 (as a transmitter), and the reception device 2120 that receives the activation/deactivation information for SCell(s) includes a RF unit 2121 (as a receiver), a determination unit 2122, and an application unit 2123. Hereinafter, an exemplary embodiment will be described for a case in which the transmission device 2110 that transmits activation/deactivation information for SCell(s) is an eNB and the reception device 2120 that receives the activation/deactivation information for SCell(s) is a UE. One of ordinary skill in the art will recognize the determination unit 2111 and the determination unit 2122 may be implemented by a processor, a firmware, etc.

The determination unit 2111 of the eNB 2110 determines activation/deactivation states of SCell(s) involved by the eNB 2110 and the determination unit 2111 configures an activation/deactivation MAC CE that indicates activation or deactivation of each of the SCell(s) according to the determination of the determination unit 2111, and the RF unit 2112 transmits the MAC CE message including the configured activation/deactivation MAC CE to the UE 2120. Further, the RF unit 2112 may transmit, to the UE 2120, information of a group including SCells provided by a MeNB and SeNB, or information which eNB provides which SCell or SCells to be configured for the UE 2120, the RF unit 2112 may transmit the information based on the determination of the determination unit 2111, that is whole information are determined by the determination unit 2111.

If the eNB 2110 is the MeNB and the MeNB and a SeNB are connected to the UE 2120 for the dual connectivity, the MeNB may receive, from the SeNB, activation/deactivation information for Scell(s) provided by the SeNB. Here, the RF unit 2112 may generate an activation/deactivation MAC CE message based on the determination result of the determination unit 2111 and the information received from the SeNB, and may transmit the generated activation/deactivation MAC CE message to the UE 2120. Whereas, if the eNB 2110 is the SeNB, herein the MeNB and the SeNB are connected to the UE 2120 for the dual connectivity, the RF unit 2112 in SeNB may transmit, to the MeNB, the activation/deactivation information for SCell(s) provided by the SeNB.

The RF unit 2121 of the UE 2120 may receive at least one of an activation/deactivation MAC CE message, information of a group including SCells provided by the MeNB and SeNB, or information which eNB provides which a SCell or SCells to be configured for the UE 2120 from the RF unit 2112 in transmitter side. The RF unit 2121 may receive the information of a group including SCells provided by the MeNB and the information about a base station that provides a SCell configured in the UE 2120 via an RRC message.

If the RF unit 2121 receives the information of a group including SCells provided by the MeNB and SeNB, or the information which eNB provides a SCell or SCells to be configured in the UE 2120, the determination unit 2122 may determine that a SCell or SCells is involved in which base station so that SCell configuration is configured in the UE 2120 based on the received information.

In accordance with the determination of the determination unit 2122, the application unit 2123 may selectively apply information of activation/deactivation indicator for corresponding SCell(s) with its own eNB among information about activation/deactivation indicators for SCells included in the activation/deactivation MAC CE message.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

What is claimed is:

1. A mobile device supporting a dual connectivity, the mobile device communicating with a master evolved NodeB (MeNB) and a secondary evolved NodeB (SeNB) for the dual connectivity, the mobile device comprising:
   a receiver configured to:
      receive, from the MeNB, information including activation/deactivation indicators of secondary serving cells (SCells) in a first SCell group configured for the mobile device; and
      receive, from the SeNB, information including activation/deactivation indicators of SCells in a second SCell group configured for the mobile device; and
   a processor operationally coupled to the receiver and configured to:
      control activation/deactivation states of the SCells in the first SCell group according to the activation/deactivation indicators of the SCells in the first SCell group identified from the information received from the MeNB; and
      control activation/deactivation states of the SCells in the second SCell group according to the activation/deactivation indicators of the SCells in the second SCell group identified from the information received from the SeNB,
   wherein the mobile device performs communication based on the controlled activation/deactivation states of the SCells in the first SCell group and the controlled activation/deactivation states of the SCells in the second SCell group.

2. The mobile device of claim 1, wherein the processor is further configured to:
   configure the dual connectivity in which the mobile device has Radio Resource Control (RRC) connections with the MeNB and the SeNB, respectively.

3. The mobile device of claim 1,
   wherein the receiver is further configured to:
      receive, from the MeNB, a Radio Resource Control (RRC) signal including information of an SCell configuration for the MeNB and information of an SCell configuration for the SeNB, and
   wherein the processor is further configured to:
      identify the information of the SCell configuration for the MeNB and the information of the SCell configuration for the SeNB.

4. The mobile device of claim 3, wherein the processor is further configured to:
   identify whether an SCell is in the first SCell group associated with the MeNB or in the second SCell group associated with the SeNB, by using the RRC signal received from the MeNB.

5. The mobile device of claim 1, wherein the receiver is further configured to:
   receive, from the MeNB, a Radio Resource Control (RRC) signal including a deactivation timer value for the MeNB and a deactivation timer value for the SeNB to control activation/deactivation status of an SCell, and
   wherein the deactivation timer value for the MeNB and the deactivation timer value for the SeNB have different integer values.

6. The mobile device of claim 1,
   wherein the processor is further configured to:
      identify that the information received from the MeNB comprises a Medium Access Control (MAC) control element (CE) having a fixed size of 8 bits, and the information received from the SeNB comprises a MAC CE having a fixed size of 8 bits, wherein each of the MAC CE received from the MeNB and the MAC CE received from the SeNB has one reserved bit and seven configurable bits, and wherein the seven configurable bits correspond to SCells having SCell indexes 1 to 7, respectively; and
      identify that a bit of the MAC CE received from the MeNB having an SCell index i corresponds to an activation/deactivation indicator of an SCell in the MeNB, and that a bit of the MAC CE received from the SeNB having an SCell index j corresponds to an activation/deactivation indicator of an SCell in the SeNB, and
   wherein i and j, which are integers among 1 to 7, have different integer values.

7. The mobile device of claim 6, wherein the processor is further configured to:
  identify, by a first MAC scheduler, a bit corresponding to an SCell associated with the MeNB from the MAC CE received from the MeNB; and
  identify, by a second MAC scheduler, a bit corresponding to an SCell associated with the SeNB from the MAC CE received from the SeNB.

8. A wireless communication system supporting a dual connectivity, the system comprising:
  a master evolved NodeB (MeNB) configured to
    connect Resource Control (RRC) connection with a User Equipment (UE), and
    transmit a Medium Access Control (MAC) control element (CE) message including activation/deactivation indicator of serving cell (SCell) associated with the MeNB to the UE,
  wherein the MAC CE message from MeNB including an indicator of index of the SCell in the SCell group of the MeNB is set to 1 or 0, wherein if the indicator of index of the SCell is set to 1, the UE activates the SCell in the SCell group of the MeNB, wherein if the indicator of index of the SCell in the SCell group of the MeNB is set to 0, the UE deactivates the SCell in the SCell group of the MeNB, and
  a secondary evoled NodeB (SeNB) is configured to
    connect Resource Control (RRC) connection with the UE, and
    transmit MAC CE message including activation/deactivation indicator of SCell associated with the SeNB to the UE,
  wherein the MAC CE message from SeNB including an indicator of index of the SCell in the SCell group of the SeNB is set to 1 or 0, wherein if the indicator of index of the SCell of the SeNB is set to 1, the UE activates the SCell in the SCell group of the SeNB, wherein if the indicator of index of the SCell in the SCell group of the SeNB is set to 0, the UE deactivates the SCell in the SCell group of the SeNB, and
  wherein the UE performs communication based on the activated or deactivated SCell in the SCell group of the MeNB and the activated or deactivated SCell in the SCell group of the SeNB.

9. The system of claim 8, wherein the MeNB is further configured to
  transmit an activation/deactivation MAC CE message to identify indexes of SCells in the SCell group of the MeNB for activation/deactivation of the SCells in the SCell group of the MeNB, and ignoring indexes of the SCells not configured for MeNB.

10. The system of claim 8, wherein the SeNB is further configured to
  transmit an activation/deactivation MAC CE message to identify indexes of SCells in the SCell group of the SeNB for activation/deactivation of the SCells in the SCell group of the SeNB, and ignoring indexes of the SCells not configured for SeNB.

11. A method for controlling activation of a serving cell by a User Equipment (UE) supporting a dual connectivity, the UE communicating with a master evolved NodeB (MeNB) and a secondary evolved NodeB (SeNB) for the dual connectivity, the method comprising:
  receiving, from the MeNB, first information including activation/deactivation indicators of secondary serving cells (SCells) in a first SCell group configured for the UE;
  receiving, from the SeNB, second information including activation/deactivation indicators of SCells in a second SCell group configured for the UE;
  controlling activation/deactivation states of the SCells in the first SCell group according to the activation/deactivation indicators of the SCells in the first SCell group identified from the first information received from the MeNB; and
  controlling activation/deactivation states of the SCells in the second SCell group according to the activation/deactivation indicators of the SCells in the second SCell group identified from the information received from the SeNB,
  wherein the UE performs communication based on the controlled activation/deactivation states of the SCells in the first SCell group and the controlled activation/deactivation states of the SCells in the second SCell group.

12. The method of claim 11, further comprising:
  configuring the dual connectivity in which the UE has Radio Resource Control (RRC) connections with the MeNB and the SeNB, respectively.

13. The method of claim 11, further comprising:
  receiving, from the MeNB, a Radio Resource Control (RRC) signal including information of an SCell configuration for the MeNB and information of an SCell configuration for the SeNB.

14. The method of claim 13, further comprising:
  identifying whether an SCell is in the first SCell group associated with the MeNB or in the second SCell group associated with the SeNB, by using the RRC signal received from the MeNB.

15. The method of claim 11, further comprising:
  receiving, from the MeNB, a Radio Resource Control (RRC) signal including a first deactivation timer value for the MeNB and a second deactivation timer value for the SeNB to control activation/deactivation status of an SCell,
  wherein the first deactivation timer value and the second deactivation timer value have different integer values.

16. The method of claim 11, wherein the first information comprises a Medium Access Control (MAC) control element (CE) having a fixed size of 8 bits, and the second information comprises a MAC CE having a fixed size of 8 bits, wherein each of the MAC CE received from the MeNB and the MAC CE received from the SeNB has one reserved bit and seven configurable bits, wherein the seven configurable bits correspond to SCells having SCell indexes 1 to 7, respectively,
  wherein a bit of the MAC CE received from the MeNB having an SCell index i corresponds to an activation/deactivation indicator of an SCell in the MeNB, and a bit of the MAC CE received from the SeNB having an SCell index j corresponds to an activation/deactivation indicator of an SCell in the SeNB, and
  wherein i and j, which are integers among 1 to 7, have different integer values.

17. The method of claim 16, further comprising:
  identifying, by a first Medium Access Control (MAC) scheduler, a bit corresponding to an SCell associated with the MeNB from the MAC CE received from the MeNB; and
  identifying, by a second Medium Access Control (MAC) scheduler, a bit corresponding to an SCell associated with the SeNB from the MAC CE received from the SeNB.

* * * * *